United States Patent [19]
Morita et al.

[11] Patent Number: 5,577,114
[45] Date of Patent: Nov. 19, 1996

[54] SUBSCRIBER LINE CONTROL APPARATUS TO CONCURRENTLY DETECT CHANGE IN LINE STATE FOR SUBSCRIBER LINES AND DETERMINE VALIDITY OF TIMER DEVICE

[75] Inventors: Sumie Morita; Ryouzi Takano; Takashi Hatano, all of Kawasaki, Japan

[73] Assignee: Fujitsu Limited, Japan

[21] Appl. No.: 434,122

[22] Filed: May 2, 1995

Related U.S. Application Data

[63] Continuation of Ser. No. 910,778, Jul. 8, 1992, abandoned.

[30] Foreign Application Priority Data

Jul. 9, 1991 [JP] Japan ................................. 3-168426

[51] Int. Cl.[6] .................................................... H04M 3/22
[52] U.S. Cl. ............................ 379/385; 379/377; 379/383; 379/384
[58] Field of Search .................................... 379/190, 191, 379/192, 193, 270, 274, 277, 286, 287, 288, 297, 377, 381, 382, 383, 384–385

[56] References Cited

U.S. PATENT DOCUMENTS

| | | | |
|---|---|---|---|
| 3,420,960 | 1/1969 | Jacoby et al. | 379/381 |
| 3,894,191 | 7/1975 | Sassa | 379/286 |
| 4,002,849 | 1/1977 | Kotler | 379/286 |
| 4,297,532 | 10/1981 | Fukuda et al. | 379/287 |
| 4,456,991 | 6/1984 | Chea, Jr. et al. | 379/382 |
| 4,792,969 | 12/1988 | Shibata et al. | 379/381 |
| 5,058,111 | 10/1991 | Kihara et al. | 370/94.2 |

FOREIGN PATENT DOCUMENTS 60-041899  3/1985  Japan ................................. 379/384

OTHER PUBLICATIONS

"Scanning Schemes in Electronic Telephone Systems", Y. Jayachandra, Telephony, Nov. 20, 1978, pp. 40–41, 44.
"A Comparison of Scanning Systems: Control Loop vs. bus Interface", Y. Jayachandra, Telephony, Jan. 1, 1979, pp. 26–28, 32.

*Primary Examiner*—Jeffery Hofsass
*Assistant Examiner*—Scott L. Weaver
*Attorney, Agent, or Firm*—Staas & Halsey

[57] ABSTRACT

A subscriber line control device utilizes a scan input table and a last look table. The scan input table stores respective current line states of a plurality of analog subscriber lines. The last look table stores respective preceding line states of the plurality of analog subscriber lines and information for validating or invalidating a timer device. A valid timer device corresponds to when a monitoring process is required. The scan input table is compared with the last look table at every predetermined cycle. When they do not match, it is judged whether the line state has changed or if the timer device is validated. Based on the judging result, an analog subscriber line control is performed according to an instruction specified by a call processing unit. The analog subscriber control is any of a call origination monitor, a dial pulse monitor, and an on-hook and off-hook (HIT) monitor.

11 Claims, 21 Drawing Sheets

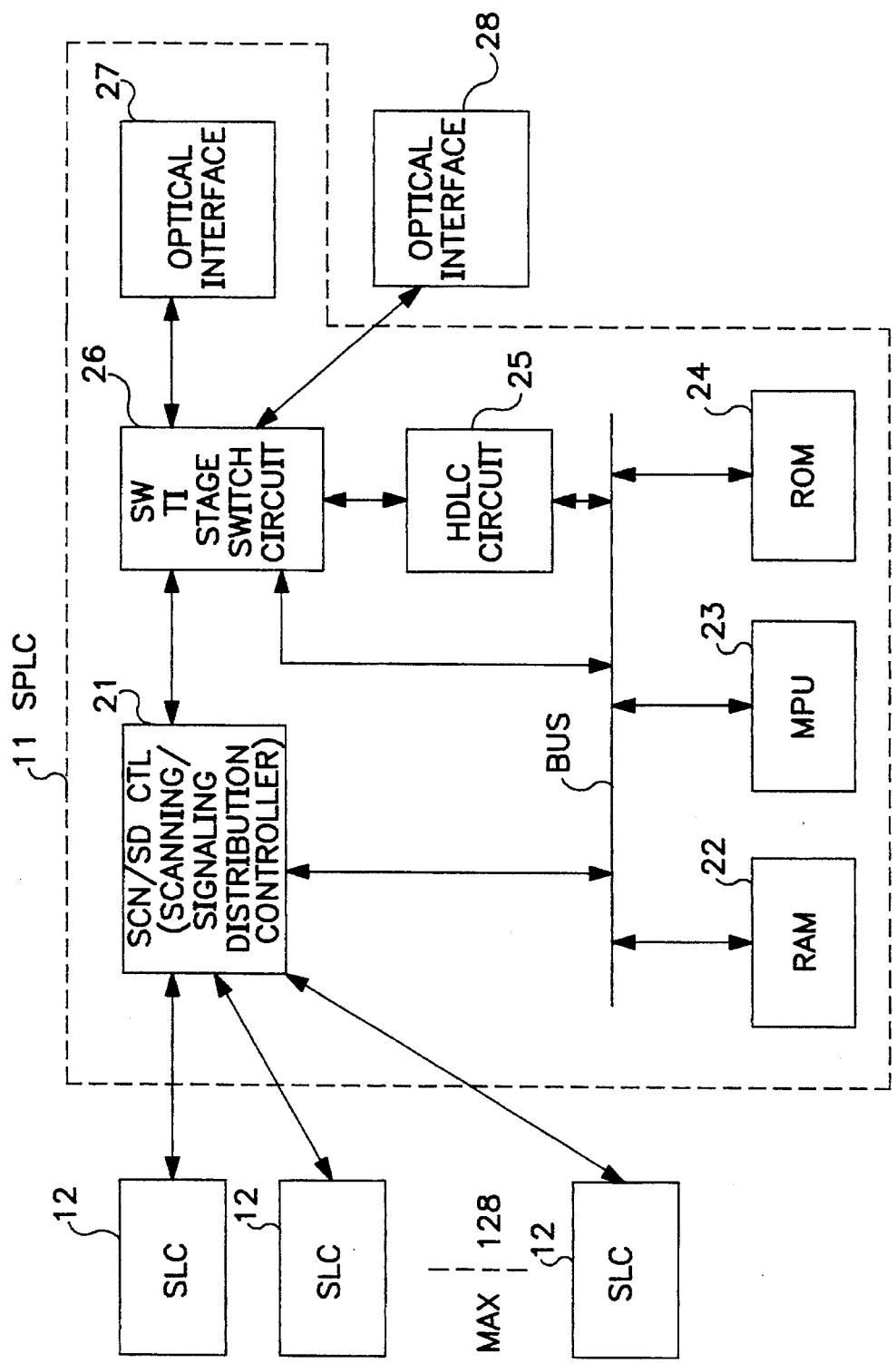

| BLOCK NAME | PROCESSING OUTLINE |
|---|---|
| MPU 23 | MICROPROCESSOR 80186 (16 BITS/WORD) |
| ROM 24 | BOOT PROGRAM, STANDBY PROCESS PROGRAM |
| RAM 22 | DOWNLOAD PROGRAM, USED AS DATA BUFFER |
| SCN/SD CTL 21 | CONTROLLING SCANNING AND SIGNAL DISTRIBUTION FOR SLC |
| SW 26 | T 1 STAGE SWITCH CIRCUIT FOR SWITCHING BETWEEN SLC CHANNELS AND LC PATHS |
| HDLC CIRCUIT 25 | LAYER 1 CONTROL BASED ON INTERNAL LAP-D BETWEEN SPLC 11 SGC 18 |
| OPTICAL INTERFACES 27 AND 28 | TERMINATION OF FIBER OPTIC CABLE, CONVERSION BETWEEN ELECTRICAL SIGNAL AND OPTICAL SIGNAL |

FIG. 3

(1) ORDINARY HIT MONITOR ······ ON HOOK MONITOR
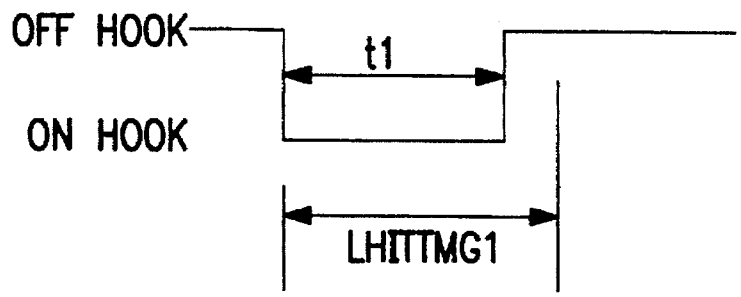
$t1 <$ LHITTMG1 : HIT DETECTION
$t1 >=$ LHITTMG1 : DISCONNECTION DETECTION
(2) RESPONSE HIT MONITOR ······ OFF HOOK (A,HIT) MONITOR
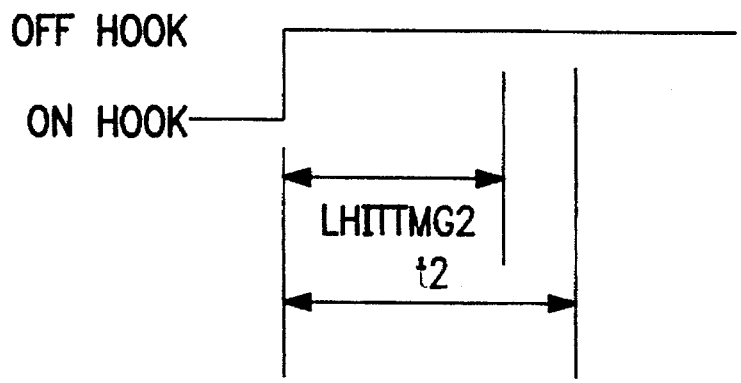
$t2 <$ LHITTMG2 : HIT DETECTION
$t2 >=$ LHITTMG2 : RESPONSE DETECTION
FIG. 15

SUBSCRIBER LINE CONTROL APPARATUS TO CONCURRENTLY DETECT CHANGE IN LINE STATE FOR SUBSCRIBER LINES AND DETERMINE VALIDITY OF TIMER DEVICE

This application is a continuation of application Ser. No. 07/910,778, filed Jul. 8, 1992, now abandoned.

BACKGROUND OF INVENTION

1. Field of the Invention

This invention relates to a subscriber line control device for accommodating either only analog circuits or both analog and digital subscriber circuits and for controlling subscriber lines.

2. Description of the Related Art

Although a digital subscriber line control device accommodating digital subscriber circuits conventionally has performed a digital subscriber line control, a line processor (LPR) has performed an analog subscriber line control, such as a supervision of a call origination and that of a dial pulse.

Generally, because a digital subscriber line control has a predetermined protocol between a subscriber terminal and a network, even if the digital subscriber line control device cannot perform its process in time, the terminal cannot perform the next procedure without a response from the network side.

Since an analog subscriber line control, on the other hand, performs its processes such as an emission of a dial pulse from an analog subscriber terminal device independently of a response from the network side, dial pulses need to be supervised every certain number of cycles, the faster the processing speed is, the more subscribers are accommodated.

SUMMARY OF THE INVENTION

This invention aims at detecting the line state of an analog subscriber line and at reducing the time required for such processing as the timer scanning.

A feature of this invention is as follows:

A memory unit stores information on the newest line state of an analog subscriber line, information on the line state at the preceding scanning of the analog subscriber line, and timer setting information for validating or invalidating a timer.

A detector unit compares the information in the above memory unit every certain number of cycles, thereby detecting a change in a line state and a validated timer.

A control unit controls an analog subscriber line based on a detection result by the detector unit.

The memory unit has a table for storing information on the newest line state of each analog subscriber line and a table for storing timer setting information for specifying the validation or the invalidation of a timer. By comparing these tables the detector unit detects a validated timer contemporaneously with a change in the line state.

Because this enables a process for detecting a change in the line state of each analog subscriber line to be performed concurrently with a process for detecting a validated timer, this invention enables the time required for both processes to be shortened and a duration from a call origination to a disconnection to be precisely measured.

BRIEF DESCRIPTION OF THE DRAWINGS

One of skill in the art can easily understand additional features and objects of this invention from the description of the preferred embodiments and the attached drawings. In the drawings:

FIG. 2 is a block diagram of an SPLC 11 in the embodiment;

FIG. 3 is an explanatory chart outlining each circuit block in an SPLC 11;

FIG. 15 is an explanatory chart of a HIT monitor;

DETAILED DESCRIPTION OF THE PREFERRED EMBODIMENT

Figure 1:
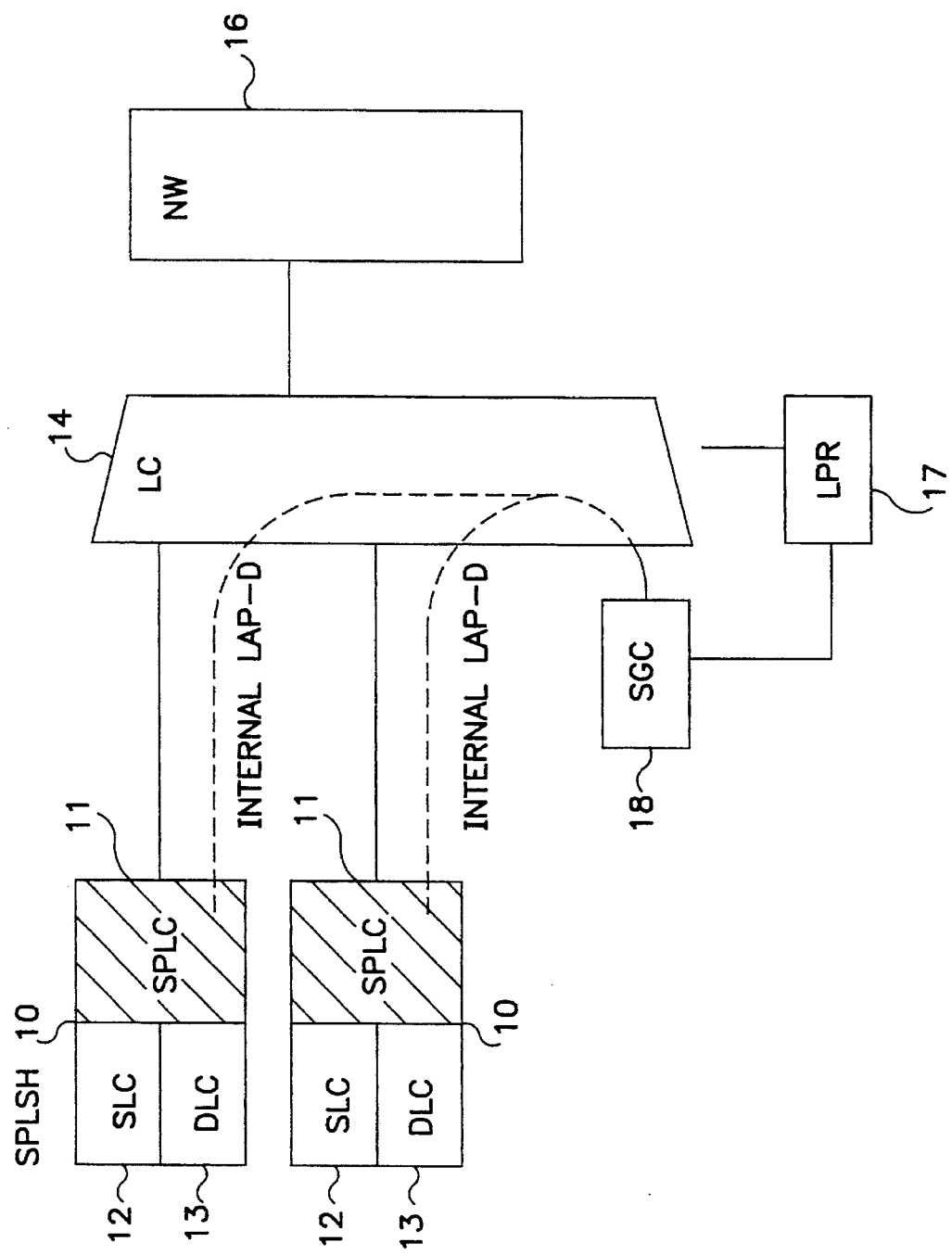
FIG. 1 is a block diagram of a digital exchanger for use in an embodiment of this invention.

A brief description of a preferred embodiment is explained below by referring to the drawings.

FIG. 1 is a block diagram of a digital exchanger (FETEX-150) for use in an embodiment of this invention.

This embodiment has a SPLSH (Subscriber Per Line Shelf) 10 package of a plurality of analog subscriber circuits SLCs (Subscriber Line Circuits) 12 and a plurality of digital subscriber circuits DLCs (Digital Line Circuits) 13, and has an SPLC 11 (Subscriber Per Line Controller) to perform a part of a per line analog subscriber line control (SCAN/SD control).

SPLSH 10 comprises a plurality of analog subscriber circuits SLCs 12 provided for respective subscribers, a plurality of digital subscriber circuits DLCs 13 and a subscriber per line controller SPLC 11 for performing a concentration of subscriber lines, a per line analog subscriber line control and a per line digital subscriber line control. The SPLSH 10 has one hundred thirty [130] analog subscriber circuits SLCs, including two [2] reserve circuits.

A line concentrator LC 14 concentrates respective lines in a plurality of SPLSHs 10 for connection to a network NW 16. A line processor LPR 17 processes a call from an analog subscriber line and a digital subscriber line. A signaling controller SGC 18 performs a message control with the SPLC 11 based on the LAP-D (Line-Access Procedure-D).

FIG. 2 is a block diagram of an SPLC 11 in the embodiment.

More specifically, it shows the hardware configuration of an SPLC 11.

FIG. 3 is an explanatory chart outlining each circuit block in an SPLC 11.

As described above, the SPLSH 10 has one hundred twenty-eight [128] analog subscriber circuits SLCs 12 (a total of one hundred thirty [130] including two [2] reserve units). A scanning/signal distribution controller (SCN/SD CTL) 21 detects an on-hook state or an off-hook state, and performs signal distribution (SD) processes such as an analog subscriber circuit control, and a reverse control and a relay control of an analog subscriber line.

An MU 23 is a microprocessor unit, e.g. 80186 (a product of the Intel Corporation), for controlling the execution of a scanning by the scanning/signal distribution controller (SCN/SD CTL) 21 and for timer processing based on a scanning result, according to the program stored in the ROM 24.

The RAM 22 is a memory comprising a scan input table for storing a result of scanning by the scanning/signal distribution controller (SCN/SD CTL) 21 and a last look table (described later) for storing the set state (valid or invalid) of a timer.

An HDLC (high level data link control procedure) circuit 25 is a circuit for performing a digital data interchange between the SPLC 11 and the SGC 18 according to the LAP-D (Link Access Procedure—D). A T1 stage switch circuit (SW) 26 concentrates subscriber lines and multiplexes their signals over to an LC (Line Concentrator) path, as well as demultiplexes signals from the LC path to the corresponding subscriber line. An LC path refers a line accommodated by an LC (line concentrator) 14.

A line between an SPLC 11 and the LC (line concentrator) 14 is a fiber optic cable, and optical interfaces 27 and 28 at the end of a fiber optic cable performs an O/E (opto-electrical) and E/O (electro-optical) conversion between an electrical signal and an optical signal.

Figure 4:
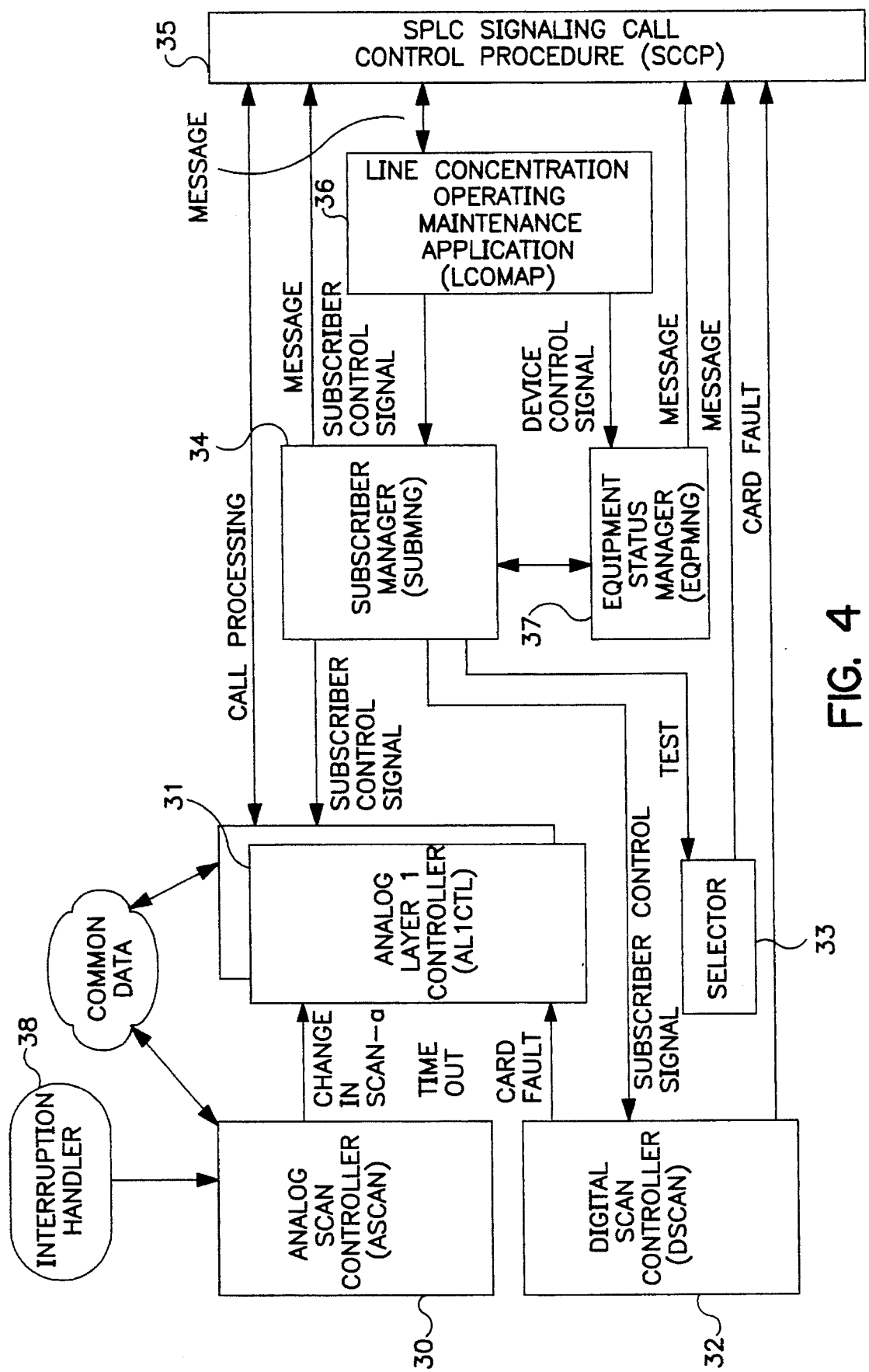
FIG. 4 is a block diagram of functional modules of an SPLC 11.

FIG. 4 is a block diagram of functional modules of an SPLC 11.

An ASCAN (Analog Scan Controller) 30 is a module for executing a scanning by an interrupting signal supplied every eight [8] milliseconds from an interruption handler 38, and writes to a scan input table a result of scanning, i.e. whether one hundred thirty [130] subscriber lines (130SUB) are on hook or off hook.

An AL1CTL (Analog Layer 1 Controller) 31 is an analog subscriber line controller for executing a call originating process, a dial pulse supervision, a HIT (i.e., a change from an on-hook condition to an off-hook condition, or vice versa) supervision, a FLASH supervision (for monitoring a hooking process for transmission), a ringer control, an SD control and an ALARM control, based on the result of processing by the ASCAN 30 and an instruction from the LPR 17. The ASCAN 30 detects a fault in a card accommodating an analog subscriber line circuit and a digital subscriber line circuit.

A DSCAN (Digital Scan Controller) 32 is a module for scanning a digital subscriber line and for supervising a fault.

A SUBMNG (Subscriber Manager) 34 provided commonly for an analog subscriber line circuit and a digital subscriber circuit accommodated by the SPLSH 10 manages a signal, for example, by outputting to the AL1CTL 31 a signal emitted from the LPR 17 to an analog subscriber line and by outputting to the DSCAN 32 via a digital subscriber line controller (not shown) a signal emitted to a digital subscriber line.

An SSCCP (SPLC Signaling Call Control Procedure) 35 is a module for exchanging messages with the LPR 17. Additionally provided are an LCOMAP (Line Concentration Operating Maintenance Application) 36 for dividing a call processing control signal and a device control signal outputted from the SSCCP 35, an EQPMNG (Equipment Status Manager) 37 for a device control, and a SELECTOR 33 for switching a line test.

The outlines of respective processes of the above are explained below by referring to the flowcharts presented as FIGS. 5 through 10.

Figure 5:
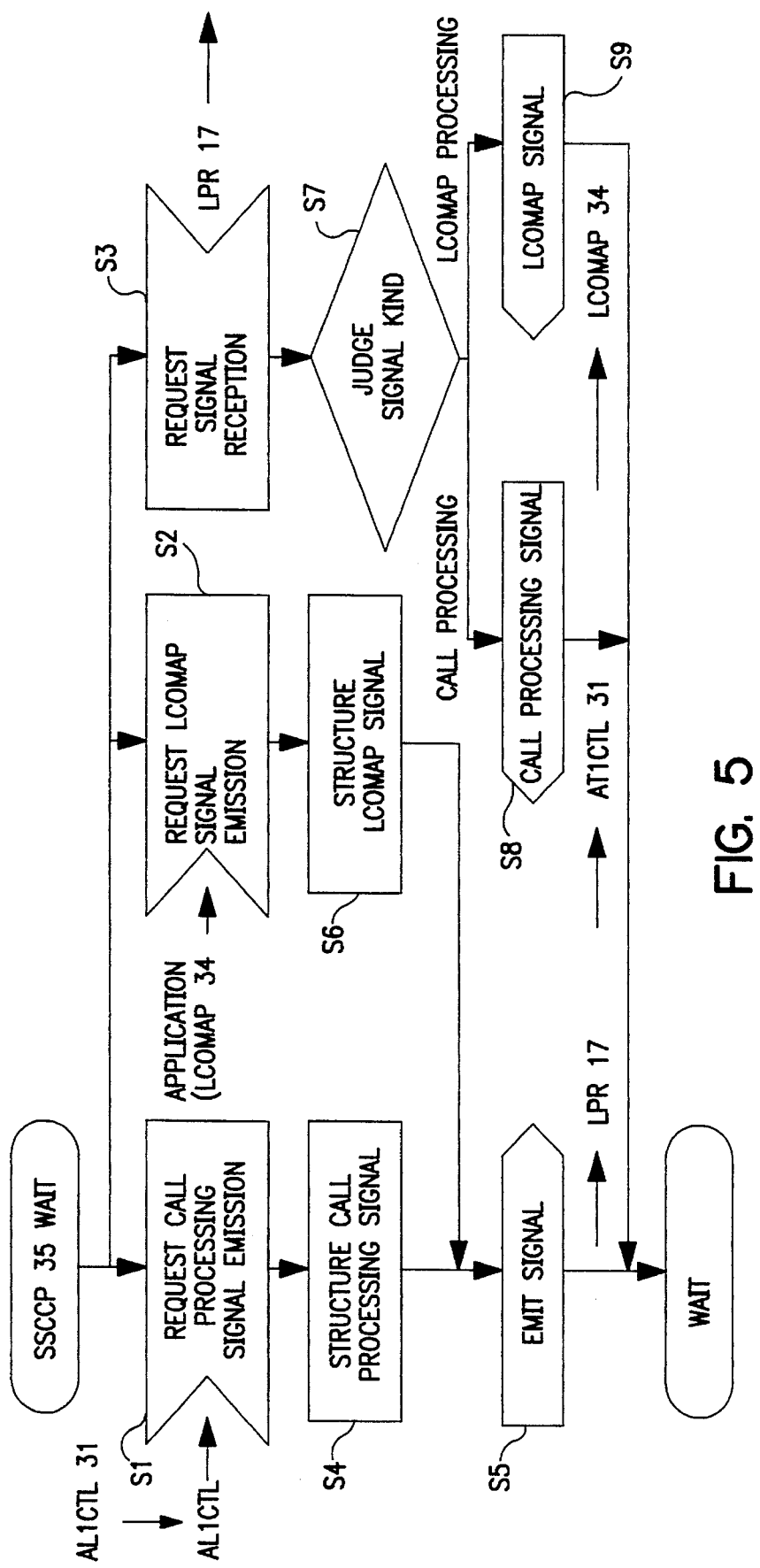
FIG. 5 is a flowchart showing the content of the processing by an SSCCP 35.

FIG. 5 is a flowchart showing the content of the processing by the SSCCP 35.

The SSCCP 35 makes a discrimination among a call processing signal emission request from the AL1CTL 31, a LCOMAP signal emission request from the LCOMAP 34, and a signal reception notification from the LPR 17. Based on the result of discrimination, the SSCCP 35 invokes step S1, S2 or S3.

When a received signal is judged to be a call processing signal emission request from the AL1CTL 31, a call processing signal is structured in step S4, and the call processing signal is emitted to the LPR 17 in step S5.

When a received signal is judged to be a LCOMAP signal emission request from an application, an LCOMAP signal is structured in step S6, and the LCOMAP signal is emitted to the LPR 17.

On the other hand, when a received signal is judged to be a signal emission notification from the LPR 17, it is determined in step S7 whether the received signal is a call processing signal or an LCOMAP signal. If the signal received from the LPR 17 is determined in step S7 to be a call processing signal, the received call processing signal is emitted to the AL1CTL 31 in step S8. If the signal received from the LPR 17 is determined in step S7 to be an LCOMAP signal, the LCOMAP signal is sent to the LCOMAP 36 in step S9.

Figure 6:
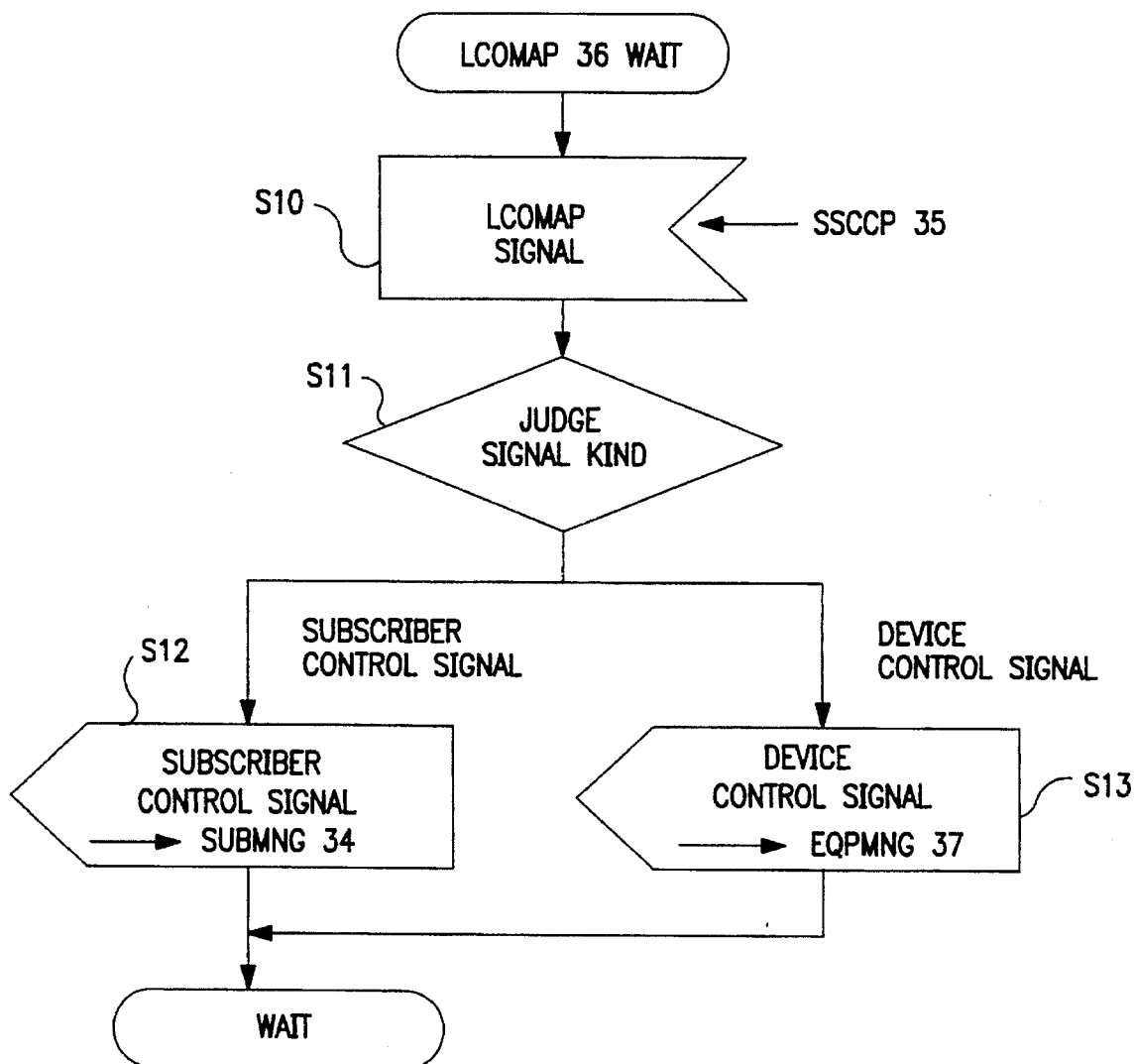
FIG. 6 is a flowchart showing the content of the processing by an LCOMAP 36.

FIG. 6 is a flowchart showing the content of the processing by the LCOMAP 36.

On receiving the LCOMAP signal from the SSCCP 35 in step S10, it is judged in step S11 whether the received signal is a subscriber line control signal or a device control signal. If the signal received from the SSCCP 35 is judged in step S11 to be a subscriber line control signal, the subscriber line control signal is emitted to the SUBMNG 34 in step S12. If the signal received from the SSCCP 35 is judged in step S11 to be a device control signal, the device control signal is emitted to the EQPMNG 37 in step S13.

Figure 7:
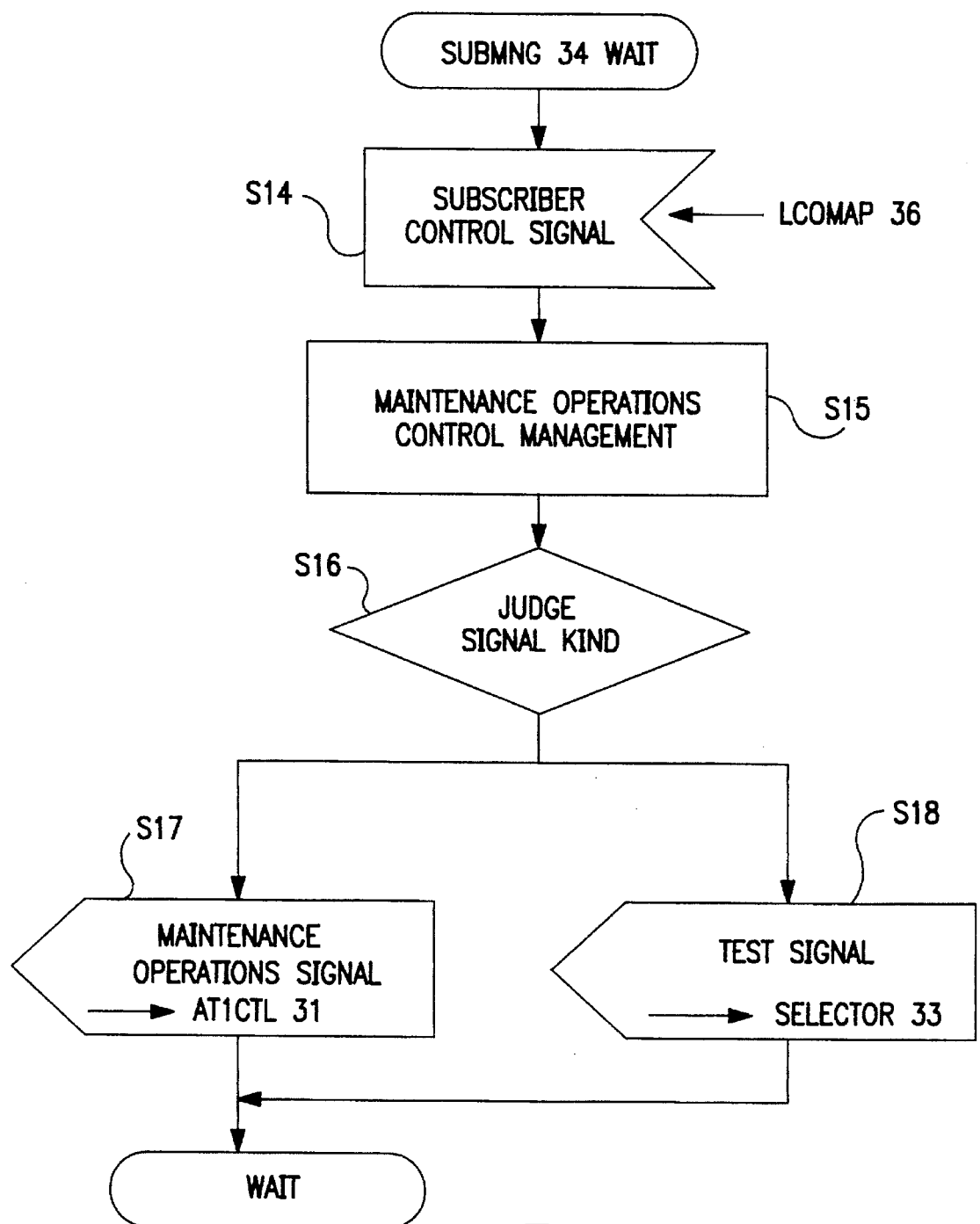
FIG. 7 is a flowchart showing the content of the processing by an SUBMNG 34.

FIG. 7 is a flowchart showing the content of the processing by the SUBMNG 34.

On receiving a subscriber line control signal from the LCOMAP 36 in step S14, a maintenance operations control management is performed in step S15, and it is judged in step S16 whether the received signal is a maintenance operations signal or a test signal. If the signal received from the LCOMAP 36 is judged in step S16 to be a maintenance operations signal, the maintenance operations signal is emitted to the AL1 CTL 31 in step S17. If the signal received from the LCOMAP 36 is judged in step S16 to be a test signal, the test signal is emitted to the SELECTOR 33 in step S18.

Figure 8:
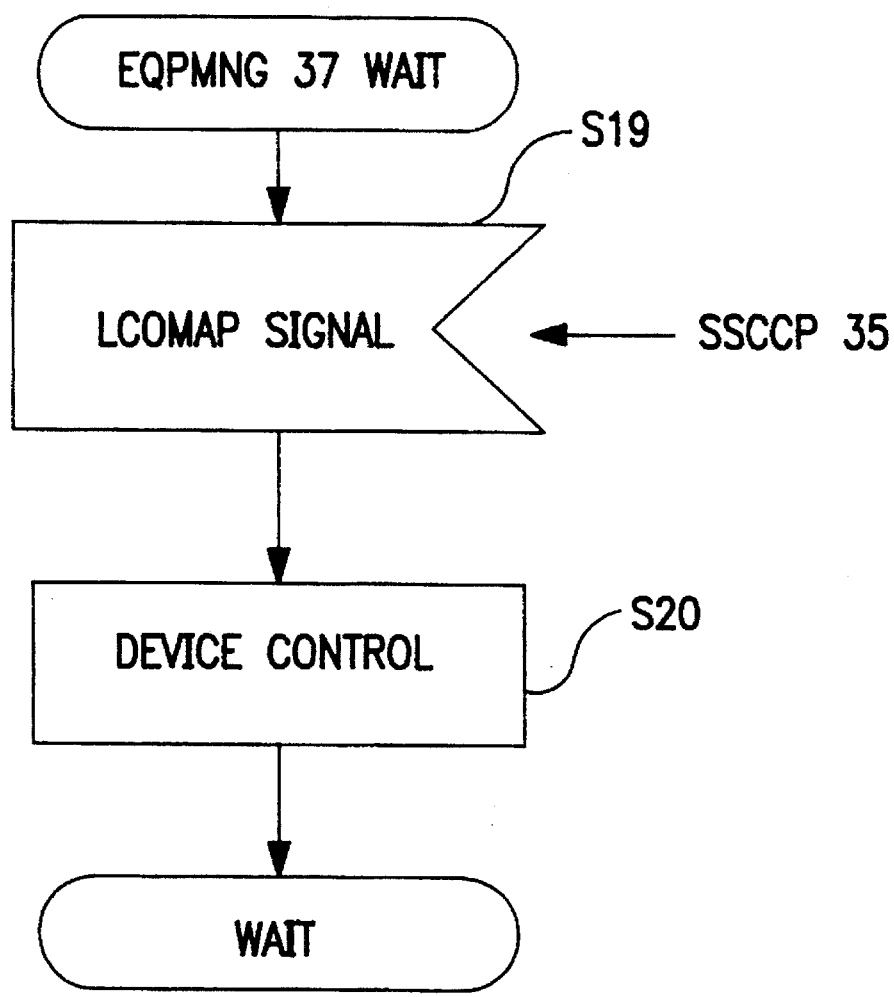
FIG. 8 is a flowchart showing the content of the processing by an EQPMNG 37.

FIG. 8 is a flowchart showing the content of the processing by the EQPMNG 37.

On receiving an LCOMAP signal (device control signal) from the LCOMAP 36 in step S19, a device control is executed in step S20.

Figure 9:
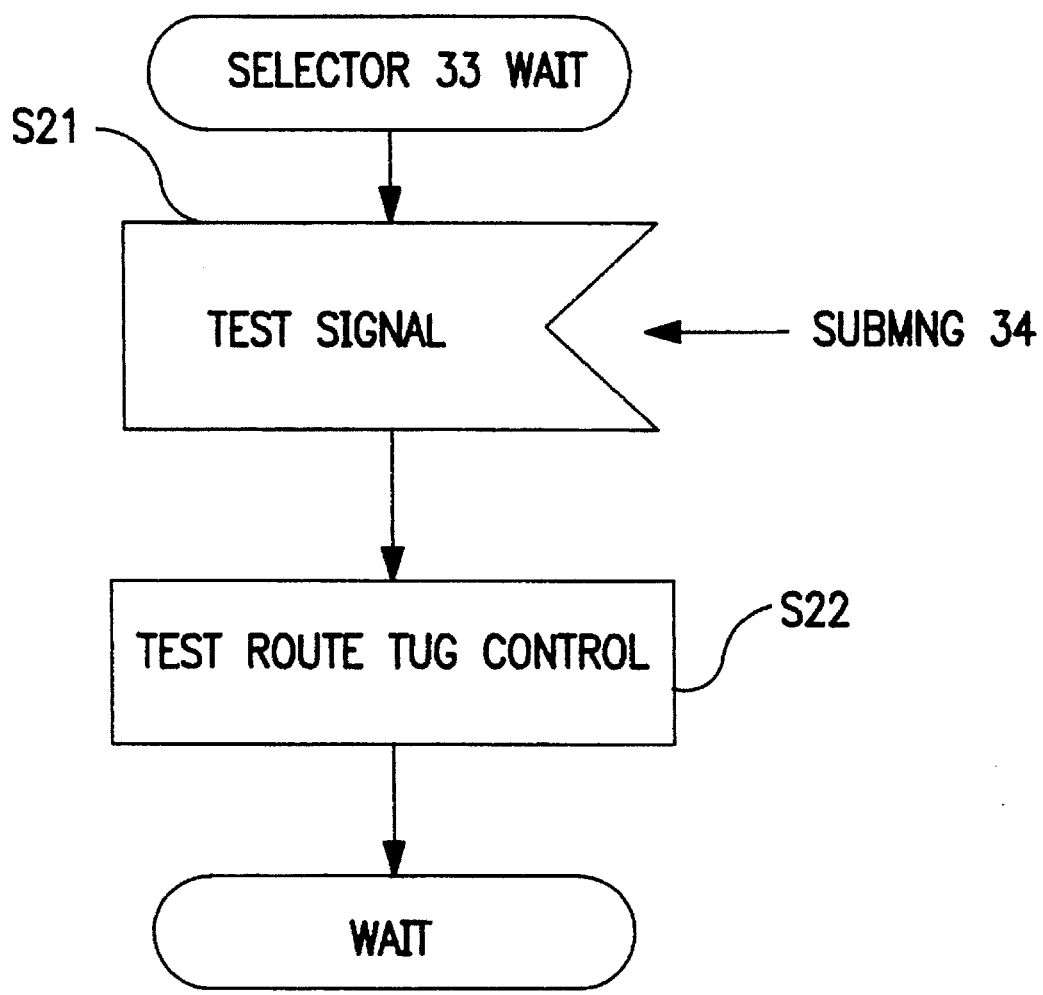
FIG. 9 is a flowchart showing the content of the processing by a SELECTOR 33.

FIG. 9 is a flowchart showing the content of the processing by the SELECTOR 33.

On receiving a test signal from the SUBMNG 34 in step S21, the SELECTOR 33 determines a test route and performs a selector control.

Figure 10:
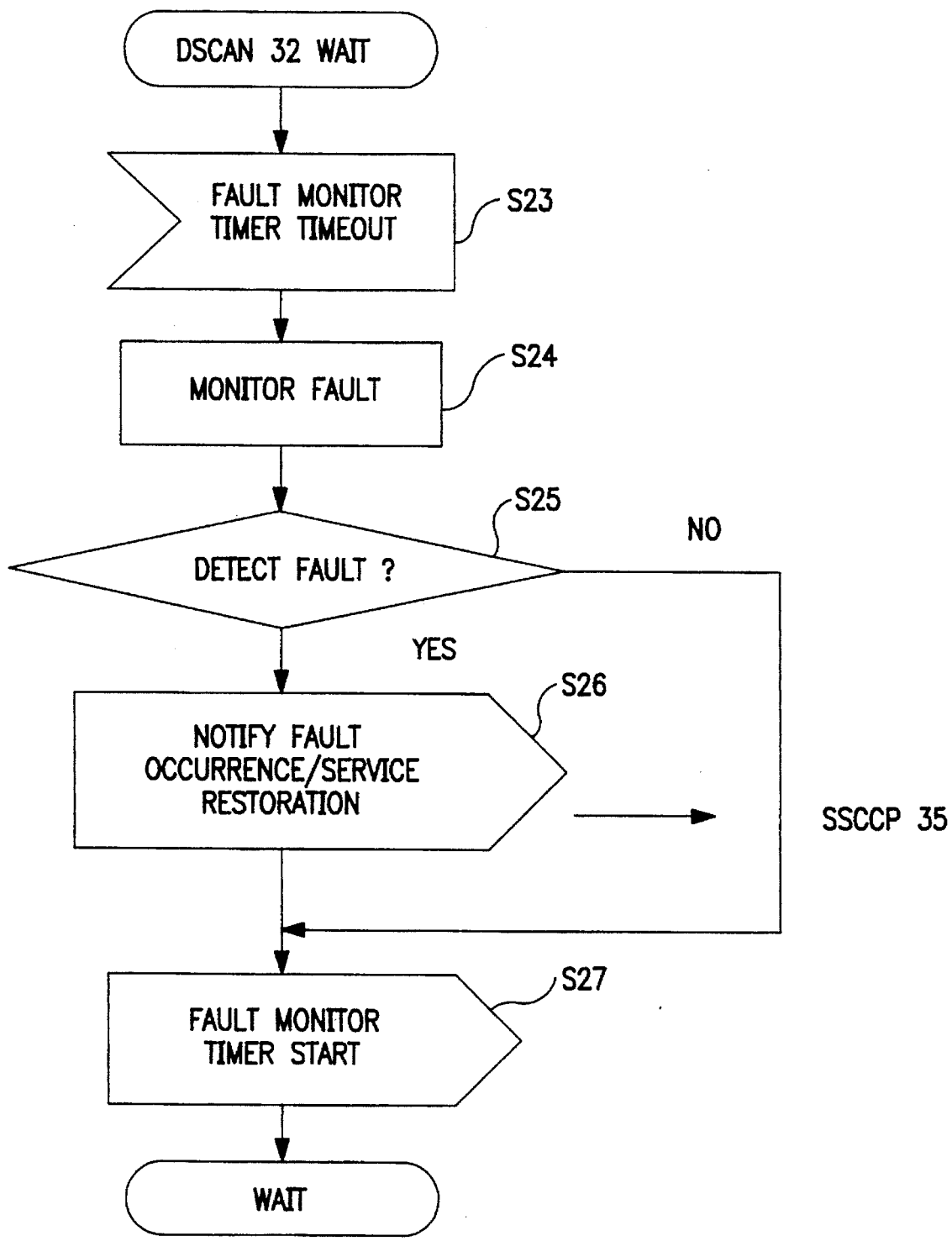
FIG. 10 is a flowchart showing the content of the processing by a DSCAN 32.

FIG. 10 is a flowchart showing the content of the processing by the DSCAN 32.

On detecting a time-out by a fault monitor timer in step S23, the DSCAN 32 monitors a fault in step S24, and judges in step S25 whether or not a fault is detected. When it is judged in step S25 that a fault is detected, the fault occurrence is notified to the SSCCP 35 in step S26, and the service restoration is also notified to the SSCCP 35 on fixing the fault. When the fault is not detected in step S25 or after step S26 is over, the fault monitor timer is restarted in step S27.

Before explaining the scanning process executed by the ASCAN 30 and the AL1CTL 31 (shown in FIG. 11), a scan input table (shown in FIG. 12) and a last look table (shown in FIG. 13) used in scanning process are explained first.

Figure 12:
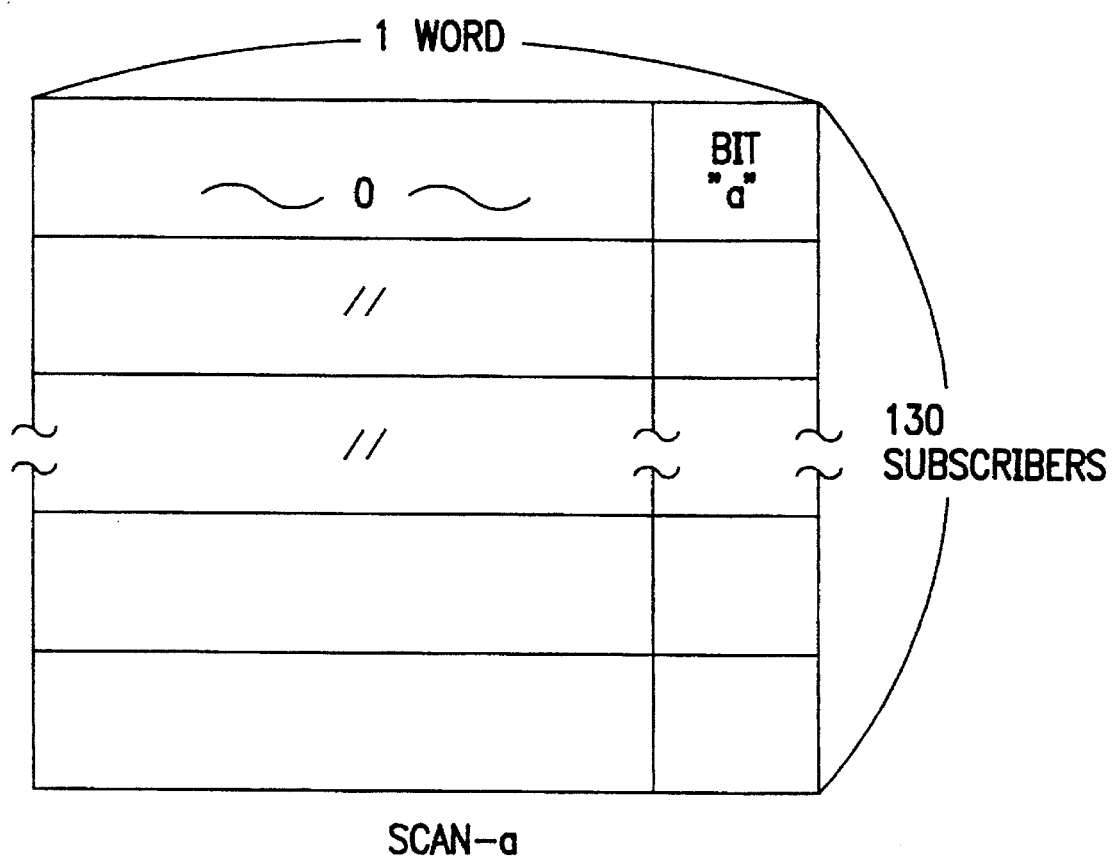
FIG. 12 is a scan input table.

FIG. 12 is the scan input table.

The scan input table has a memory area for one hundred thirty [130] addresses (for the equal number of subscriber lines) of "SCAN-a" each comprising one [1] word, i.e. sixteen [16] bits. A bit "a" at the right end of each word stores an on-hook state or an off-hook state of the corresponding subscriber line. Other fifteen [15] bits, all initialized to "0", correspond to mask timer bits and timer run bits in the last look table.

Figure 13:
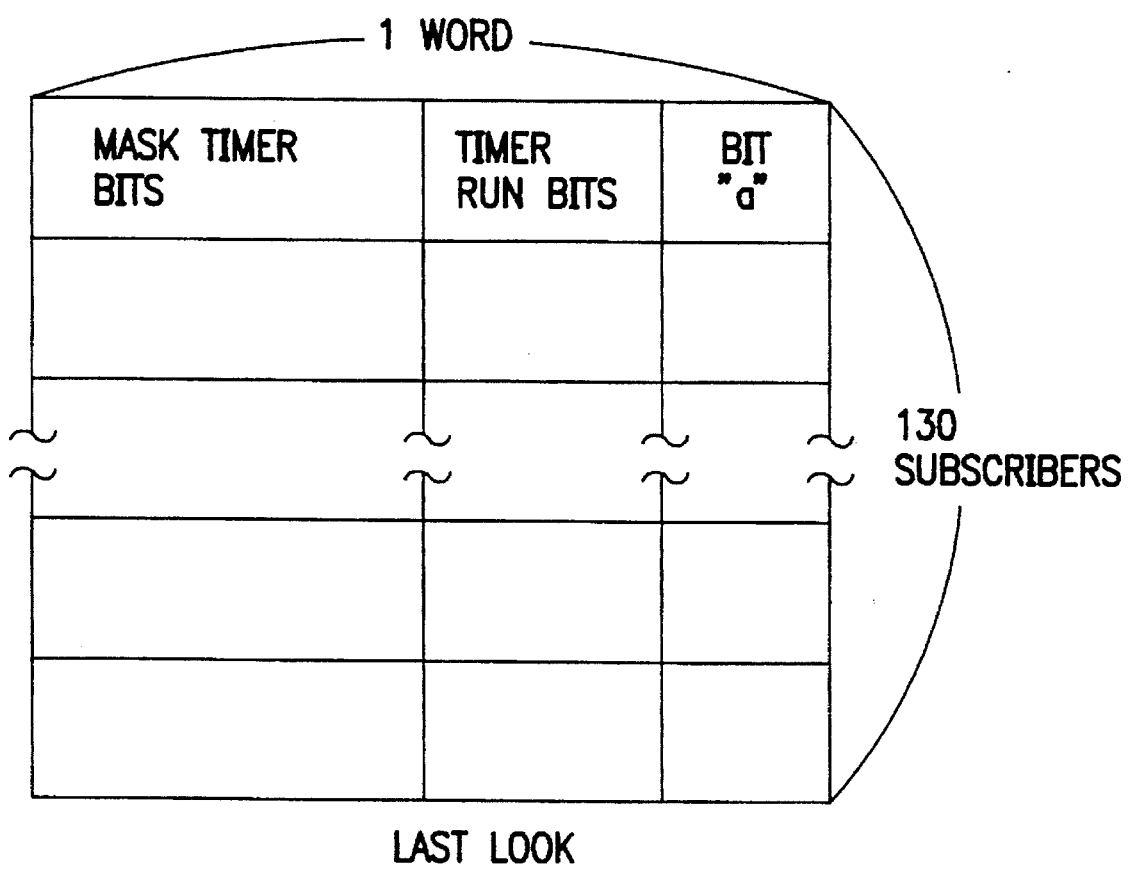
FIG. 13 is a last look table.

FIG. 13 is the last look table.

The last look table also has a memory area for one hundred thirty [130] addresses (for the equal number of subscriber lines) each comprising one [1] word, i.e. sixteen [16] bits. A bit "a" at the right end of each word stores an on-hook state or an off-hook state of the corresponding subscriber line. The timer run bits comprise seven [7] bits for determining the validation or invalidation of a timer used e.g. for a call origination monitor a dial pulse monitor and a HIT monitor (i.e., monitoring on-hook conditions by the termination of the communication through a subscriber line and monitoring off-hook conditions by a reply of a subscriber line). The mask timer bits comprise eight [8]bits for determining the validation or invalidation of a timer used for a masking the bits in "SCAN-a" for a predetermined time period.

A comparison between the scan input table and the last look table respectively having the above data structures enables a change in the bits of "SCAN-a" to be determined simultaneously with a judgment of a validation or invalidation of a timer.

Figure 11:
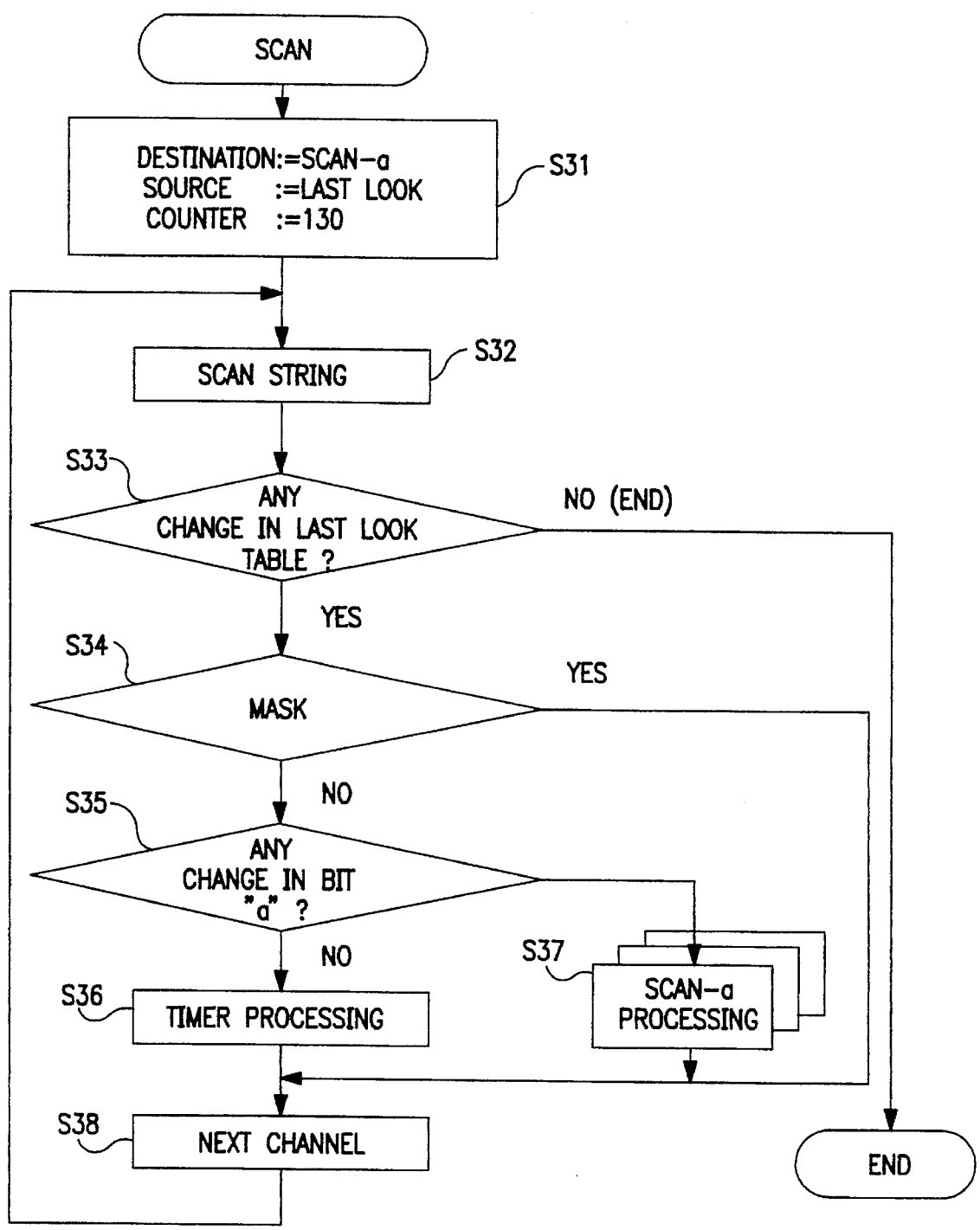
FIG. 11 is a flowchart showing the content of scanning process executed by an ASCAN 30 and an AL1CTL 31.

FIG. 11 is a flowchart showing the content of scanning process executed by an ASCAN 30 and an AL1CTL 31.

The MPU 23 (e.g. 80186) has a string instruction called a CMPS instruction (i.e., a compare string or instruction of a 16-bit MPU of an INTEL system, for use in determining whether or not the source of the CMPS instruction and the destination match in each bit) for subtracting a source string from a destination string and for setting a flag according to the result.

Before executing the CMPS instruction, the MPU 23 in step S31 sets a head end address of the scan input table to the destination string, a head end address of the last look table to the source string, and the number of subscriber lines, i.e. one hundred thirty [130], to a counter.

The MPU 23 in step S32 executes the CMPS instruction being a string instruction and compares one [1] word data in the head end address of the scan input table with one [1] word data in the head end address of the last look table. The MPU 23 in step S33 judges from the flag value set by the comparison (executed by the CMPS instruction in step S32) whether or not the one [1] word data in the head end address of the scan input table match the one [1] word data in the head end address of the last look table.

If they do not match, because at least one [1] bit in the "SCAN-a" (corresponding to one [1] bit in any of the mask timer bits, the timer run bits and the bit "a") must have changed to "1", the MPU 23 judges in step S34 whether or not any of the mask timer bits changes to "1". When one of the mask timer bits is judged to change to "1", after updating the timer for masking the bits in "SCAN-a", the MPU 23 in step S35 specifies the next channel, i.e. the next address in the scan input table and the last look table.

If the MPU 23 judges in step S34 that none of the mask timer bits have changed to "1", the MPU 23 judges in step S35 whether the bit "a" has changed or not. If the MPU 23 judges in step S37 that the bit "a" has changed, the MPU 23 executes in step S38 a "SCAN-a" process of a corresponding channel.

More specifically, the "SCAN-a" process refers to a process e.g. for a call origination monitor, a dial pulse monitor and a HIT monitor. If the LPR 17 instructs a dial pulse monitor, for instance, the MPU 23 invokes a timer when the bit "a" has changed, thereby counting the on-hook and off-hook periods of a dial pulse for detecting a dial number and a digit separation. When the "SCAN-a" process of the corresponding channel has ended in step S37, the MPU 23 specifies the next channel in step S38.

When the MPU 23 does not judge in step S35 that the bit "a" has changed, because "1" is set in any of the timer run bits of the last look table, the MPU 23 executes in step S36 the timer process in correspondence with the bit in the timer run bits to which "1" is set.

Hence, by setting "1" in the bit among the timer run bits corresponding to the appropriate timer e.g. used for a call origination monitor, a dial pulse monitor and a HIT monitor, a timer counting is performed every eight milliseconds [8 ms] for a scanning process.

On completing the timer process in step S36, the MPU 23 specifies the next channel in step S38.

Thereafter, the MPU 23 executes the process back in step S32, thereby performing the process similar to the above for the data in the next address in the scan input table and the last look table. When all the addresses in the scan input table and the last look table are completely scanned (NO in step S33), the MPU 23 terminates the scanning process.

This embodiment can be summarized as follows:

The last look table comprises the bit "a" for storing the channel state (i.e. on hook or off hook) at the last scanning time and the mask timer bits and the timer run bits for storing timer setting data validating or invalidating respective timers.

The last look table is compared with the scan input table at every predetermined period, (which is eight milliseconds [8 ms] in this case,) so that the detection of the channel state of an analog subscriber line is performed simultaneously with the timer scanning process.

Accordingly, this invention greatly reduces the time required for scanning, in comparison with a prior art method by which the timer scanning process is performed separately from the channel state detection process.

A reduction of a cycle for scanning all subscriber lines (one hundred thirty [130] in this case) from thirty-two milliseconds [32 ms] as in a prior art to eight milliseconds [8 ms] as in this embodiment enables the time from a call origination to a call disconnection to be more accurately counted, thereby improving the accuracy of a time charge accounting.

The various kinds of monitors performed by the SPLC 11 are explained below.

On receiving from the LPR 17 an instruction for a call origination monitor, the SPLC 11 detects a change in the bit "a" from "1" to "0" in a scanning process performed every eight milliseconds [8 ms], thereby detecting a change of the channel from an on-hook state to an off-hook state. When a Gall origination is detected by a change the bit "a", it is necessary to detect the bit "a" being "0" continuously for a certain duration. However, because this embodiment has hardware perform a noise protection of about ten milliseconds [10 ms], there is no need to monitor the continuity of an off-hook state.

On receiving from the LPR 17 an instruction for a dial pulse monitor, the SPLC 11 sets "1" to the appropriate bit (the bit corresponding to the timer used for a dial pulse monitor) among the timer run bits for the corresponding channel in the last look table. When a scanning progress performed every eight milliseconds [8 ms] detects that the value of bit "a" has changed, a timer is invoked for counting both the on-hook period and the off-hook period. A dial pulse having an on-hook period not more than a duration Y (e.g. one hundred ninety-two milliseconds [192 ms]) and an off-hook period not more than a duration X (e.g. one hundred ninety-two milliseconds [192 ms]) is counted and processed as a dial number. An off-hook state more than duration X is progressed as a digit separation, and an on-hook state more than duration Y is progressed as a call disconnection.

Figure 14:
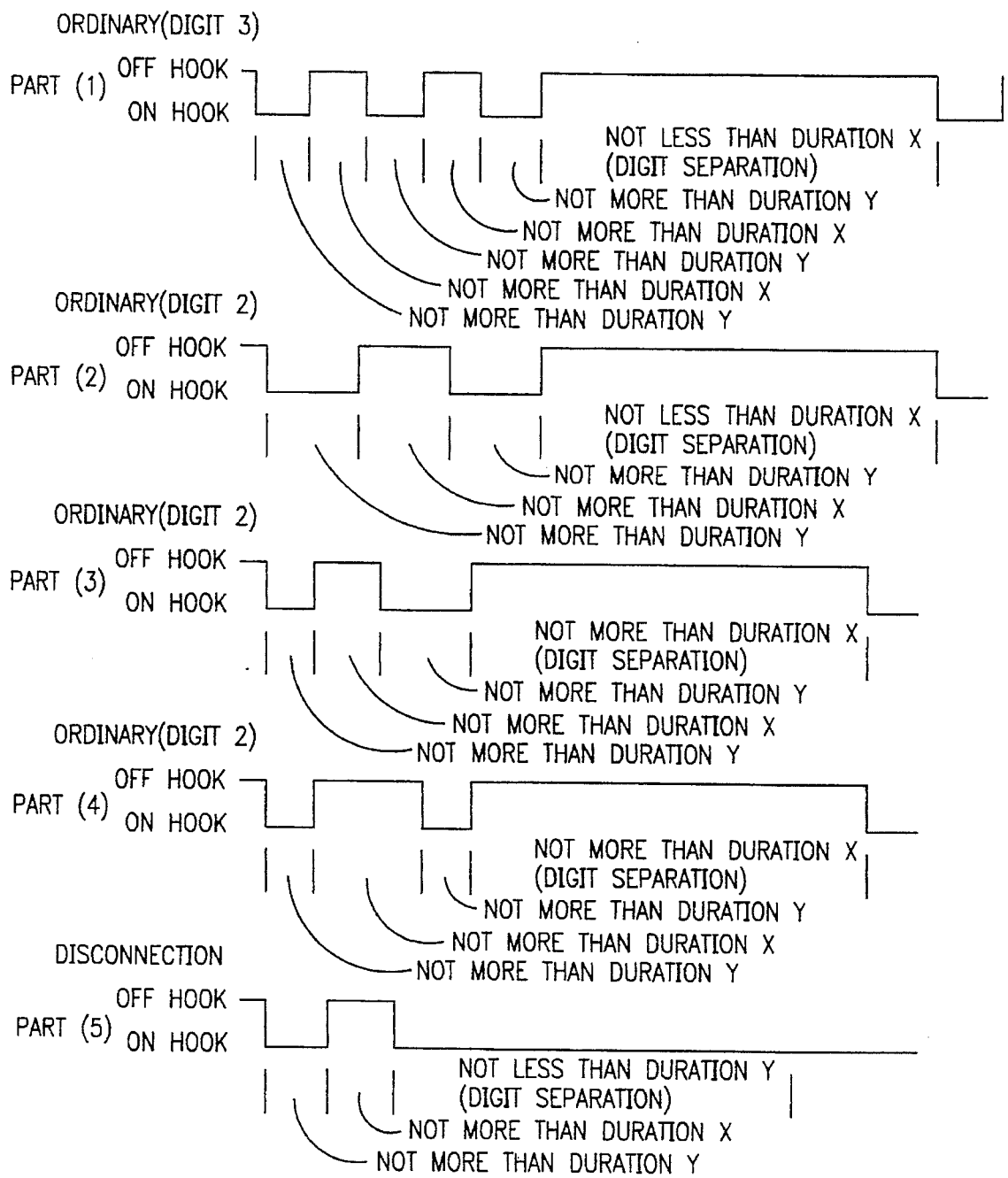
FIG. 14 is an explanatory chart of a dial pulse monitor.

FIG. 14 is an explanatory chart of a dial pulse monitor.

As shown in its part (1), a dial number e.g. "3" is recognized, when a pulse having an on-hook period not more than duration Y (one hundred ninety-two milliseconds [192 ms] in this example) and an off-hook period not more than duration X (one hundred ninety-two milliseconds [192 ms] in this example), as well as an off-hook state not less than duration X, is detected.

Also, as shown in its parts (2), (3) and (4), a dial number e.g. "2" is recognized, when two [2] pulses having an on-hook period not more than duration Y and an off-hook period not more than duration X, as well as an off-hook state not less than duration X, are detected.

Further, as shown in its part (5), when an on-hook state not less than duration Y is detected, a call disconnection process is performed.

FIG. 15 is an explanatory chart of a HIT monitor.

On receiving from the LPR 17 an instruction for a hit monitor, the SPLC 11 invokes a HIT monitor, an on-hook monitor for detecting an end of a subscriber's call or an off-hook monitor for detecting a response from a subscriber.

As shown in its part (1), when the LPR 17 instructs an ordinary HIT monitor, i.e. an on-hook monitor, the SPLC 11 sets "1" to the corresponding bit in the timer run bits of the last look table, and has the timer begin counting time when the value of bit "a" changes to "1" (i.e. when the line gets into an on-hook state). In the timer processing, an on-hook period t1 less than a predetermined duration LHITTMG1 is processed as a HIT detection, while the on-hook period t1 not less than predetermined duration LHITTMG1 is processed as a detection of a call disconnection.

As shown in its part (2), when the LPR 17 instructs a response HIT monitor, i.e. an off-hook monitor, for detecting a response from a call terminating subscriber line, the SPLC 11 validates the timer used in the response HIT monitor by setting "1" to the corresponding bit in the timer run bits, thereby having the timer start its counting time when the value of the bit "a" in the call terminating subscriber line has changed to "0", i.e. when the call terminating subscriber line gets to an off-hook state. In the timer processing, an off-hook period t2 less than a predetermined duration LHITTMG2 is processed as a HIT detection, while the off-hook period t2 not less than predetermined duration LHITTMG2 is processed as a detection of a response from a call terminating subscriber.

The greater the number of subscriber lines performing a dial pulse monitor in scanning process is, the greater is the time required for performing the scanning process. Hence, it is conceivable that the scanning cycle of eight milliseconds [8 ms] cannot be achieved. Consequently, in this embodiment, the maximum number of subscriber lines n whose dial pulses can be monitored is precalculated within the limit of the scanning cycle of eight milliseconds [8 ms]. Then, the number of subscriber lines whose dial pulses can be monitored are counted. When the count value reaches the maximum number of subscribers n, the dial pulses are not counted for the call originations thereafter. After the number of subscriber whose dial pulses are counted reaches the upper limit value n, only a notification to the LPR 17 of an ABANDON signal by a timer counting an on-hook period or a reception of a DIGSTOP signal from the LPR 17 is performed for the call origination. After receiving either of these events, the SPLC 11 waits for an instruction from the LPR 17 for a call reception.

Because the LAP-D is adopted for the communications between the ASCAN 30 and the AL1CTL 31 and between the AL1CTL 31 and the LPR 17, the greater the number of events the ASCAN 30 issues, the longer the processing time required for the communications in between. Hence, it is conceivable that the scanning cycle of eight milliseconds [8 ms] cannot be achieved. Consequently, in this embodiment, the maximum number of events 1 between the ASCAN 30 and the AL1CTL 31 and the maximum number of events m between the AL1CTL 31 and the LPR 17 are precalculated within the limit of the scanning cycle of eight milliseconds [8 ms]. Then, respective event notifications are restricted so that their numbers do not exceed those maximum number of events 1 and m. Maximum number of events 1 between the ASCAN 30 and the AL1CTL 31 is assumed to include maximum number of events m between the AL1CTL 31 and the LPR 17.

After the number of events between the AL1CTL 31 and the LPR 17 reaches maximum number of events m, or after the number of events between the ASCAN 30 and the AL1CTL 31 reaches maximum number of events 1, only the processes that can be concluded between the ASCAN 30 and the AL1CTL 31, namely a process of counting dial pulses, a process of decrementing a ringer timer and a process of decrementing a timer table, are performed.

Figure 16:
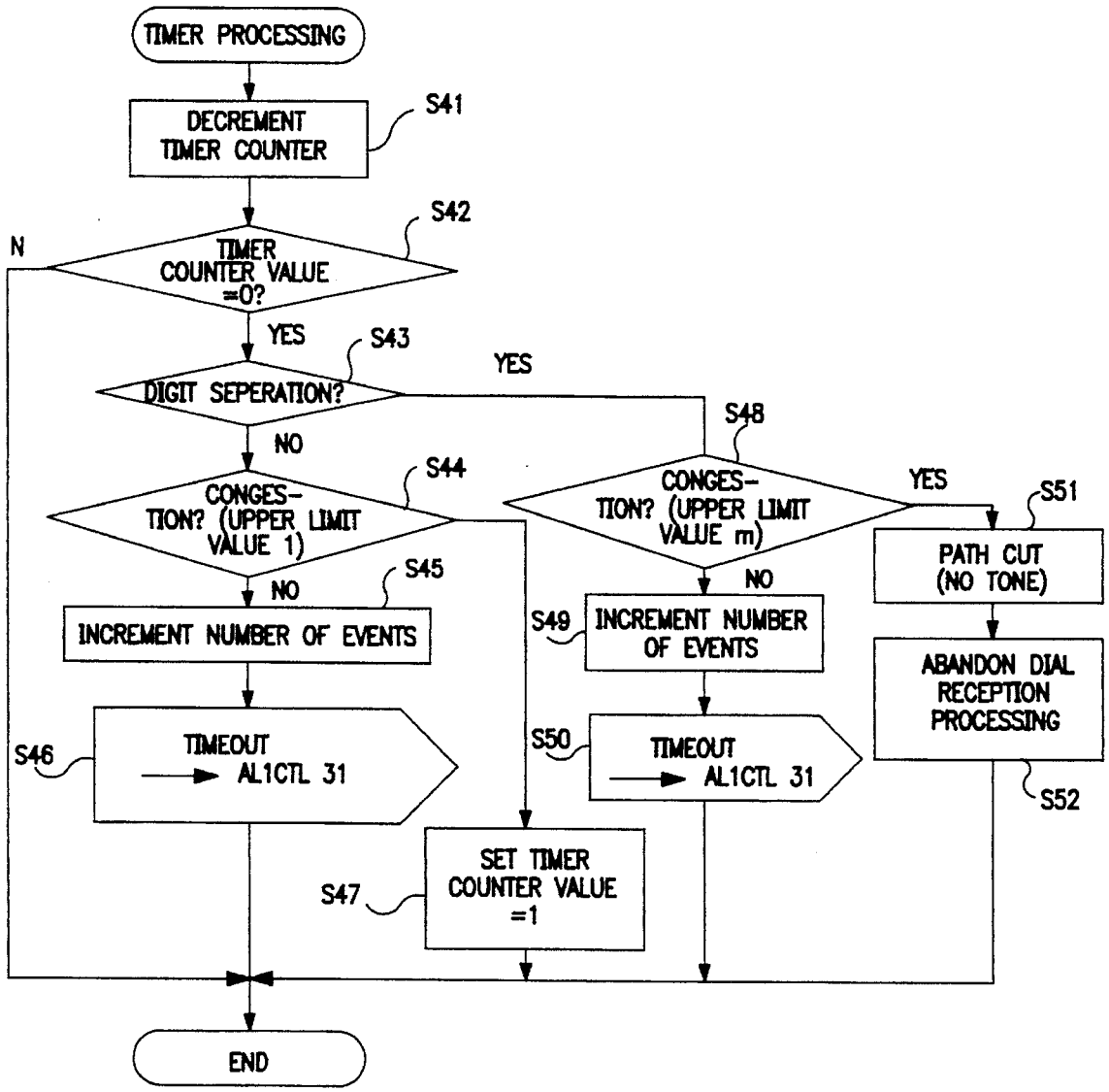
FIG. 16 is a flowchart for a timer process.

FIG. 16 is a flowchart for a timer process.

More specifically, FIG. 16 illustrates in relation to the above described congestion process the timer process for use in a scanning process shown in FIG. 11.

The timer counter validated by the corresponding bit in the timer run bits is decremented in step S41.

It is judged in step S42 whether or not the value of the timer counter is "0". When the value of the timer counter is judged to be "0", (YES in step S42,) it is judged in step S43 whether or not a time-out has occurred by detecting a digit separation between dial numbers.

If a digit separation is not detected, (NO in step S43,) since the event is between the ASCAN 30 and the AL1CTL 31, a congestion state is detected in step S44 by judging whether or not the number of events issued by the ASCAN 30 has reached maximum event number 1.

If a congestion state is not detected, (NO in step S44,), the counted number of events issued by the ASCAN 30 is incremented in step S45, and the timeout is notified to the AL1CTL 31 in step S46.

If a congestion state is detected, (YES in step S44,) "1" is set to the timer counter in step S47, thereby preventing an event from being generated by a time-out.

If a time-out by a digit separation is detected, (YES in step S43,) a congestion state is detected in step S48 by judging whether or not the number of events issued between the AL1CTL31 and the LPR 17 has reached maximum event number m.

If a congestion state is not detected, (NO in step S48,) the counted number of events issued between the AL1CTL 31 and the LPR 17 is incremented in step S49, and the time-out by a digit separation detection is notified to the AL1CTL 31 in step S50.

When a congestion state is detected, (YES in step S48,) because the number of events issued between the ASCAN 30 and the LPR 17 has reached maximum event number m, no notification of reception is made in response to an instruction from the LPR 17 for a call origination in step S51, and a dial reception process is abandoned in step S52.

The above congestion control enables the time required for a scanning process to be restricted by limiting the number of events issued between the ASCAN 30 and the LPR 17, thereby ensuring the maintenance of a scanning cycle (e.g. eight milliseconds [8 ms] ).

The control sequences between the SPLC 11 and the LPR 17 are explained below by referring to FIGS. 17 through 21.

Figure 17:
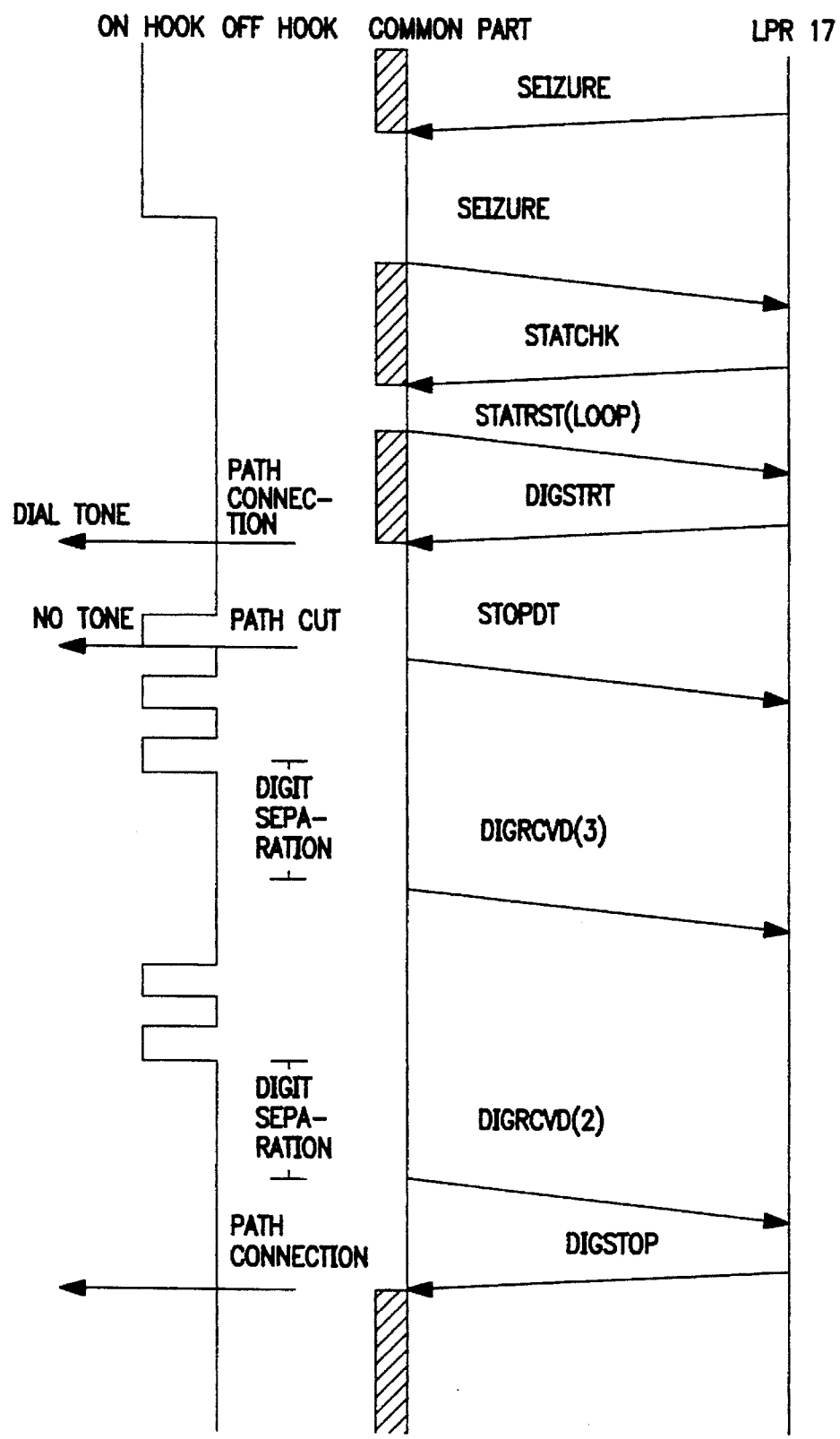
FIG. 17 is a sequence diagram showing a case in which a dial pulse from a call originating subscriber is normally received.

FIG. 17 is a sequence diagram showing a case in which a dial pulse from a call originating subscriber is normally received.

On receiving from the LPR 17 a SEIZURE (seizure detection start request), the SPLC 11 returns to the LPR 17 the SEIZURE "as is".

On receiving from the LPR 17 a STATCHK (line status check start request) requesting a line status check, the SPLC 11 detects a change in a line status by comparing the scan input table with the last look table and returns a STATRST (line status result) to the LPR 17.

On receiving from the LPR 17 a DIGSTRT (digit detection start request) requesting a monitor of a dial pulse, the SPLC 11 emits a dial tone to the subscriber's terminal by connecting a line. On detecting a dial pulse from a subscriber's terminal, the SPLC 11 ceases to emit a dial tone and emits to the LPR 17 a STOPDT (stop dial tone) instructing an end of a dial tone emission.

The SPLC 11 executes a monitor of a dial pulse described earlier. On detecting a digit separation i.e. an off-hook over one hundred ninety-two milliseconds [192 ms], the SPLC 11 emits the counted number of dial pulses as a DIGRCVD (digit received) in dial pulse reception data. The next dial pulses are similarly detected.

Figure 18:
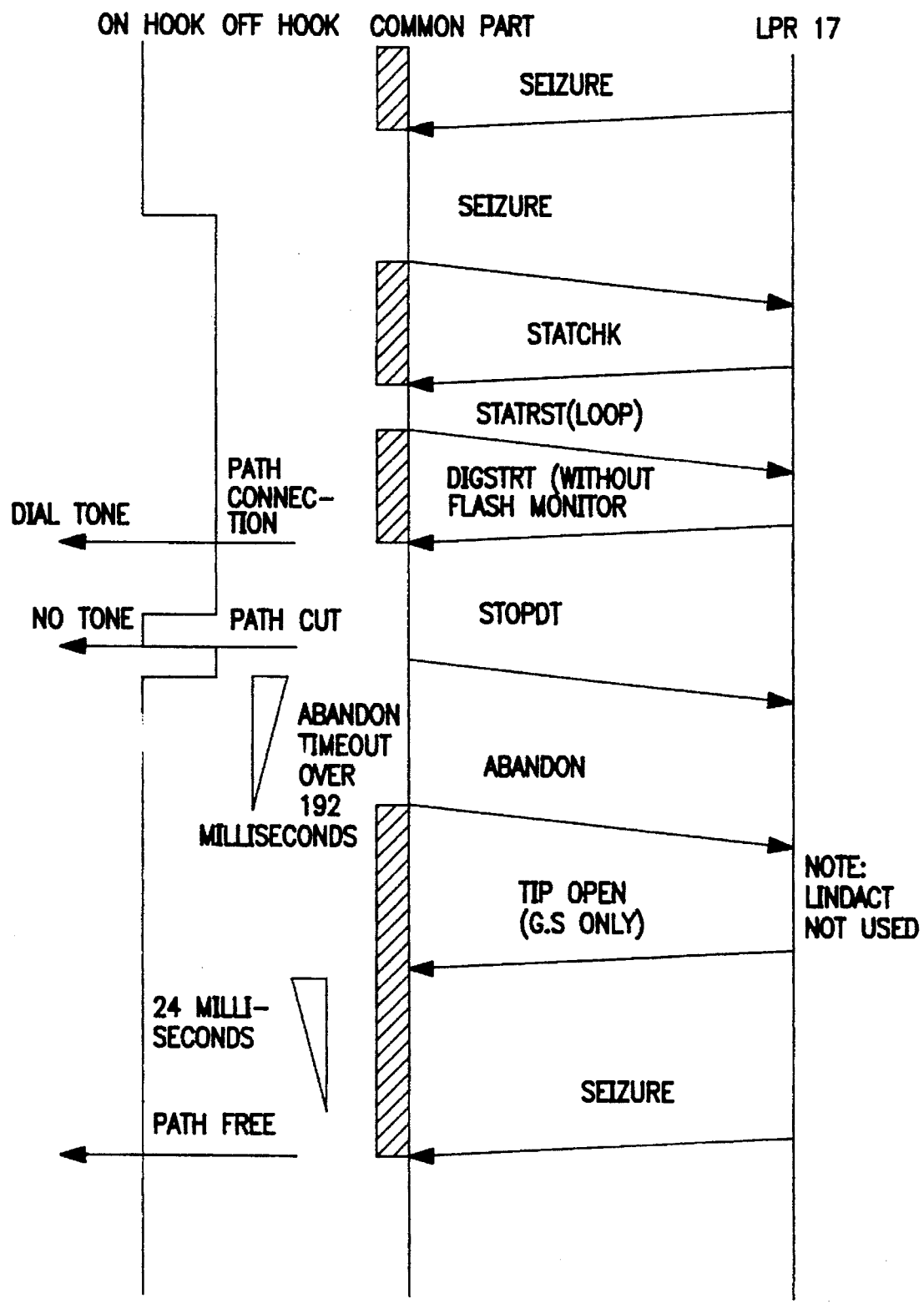
FIG. 18 is a sequence diagram showing a case in which a call disconnection occurs while a dial pulse is received.

FIG. 18 is a sequence diagram showing a case in which a call disconnection occurs while a dial pulse is received.

If a timer detects a time-out, by detecting an on-hook state of more than one hundred ninety-two milliseconds [192 ms], while a dial pulse detection is performed according to the DIGSTRT requesting a monitor of a dial pulse from the LPR 17, the SPLC 11 notifies the LPR 17 of an ABANDON by assuming that the line is disconnected during a dialing. "TIP OPEN" (G.S. exclusively) is a command to confirm whether or not a service for a G.S. (i.e., Ground Start) terminal accommodated in a PBX, etc. is actually provided.

Figure 19:
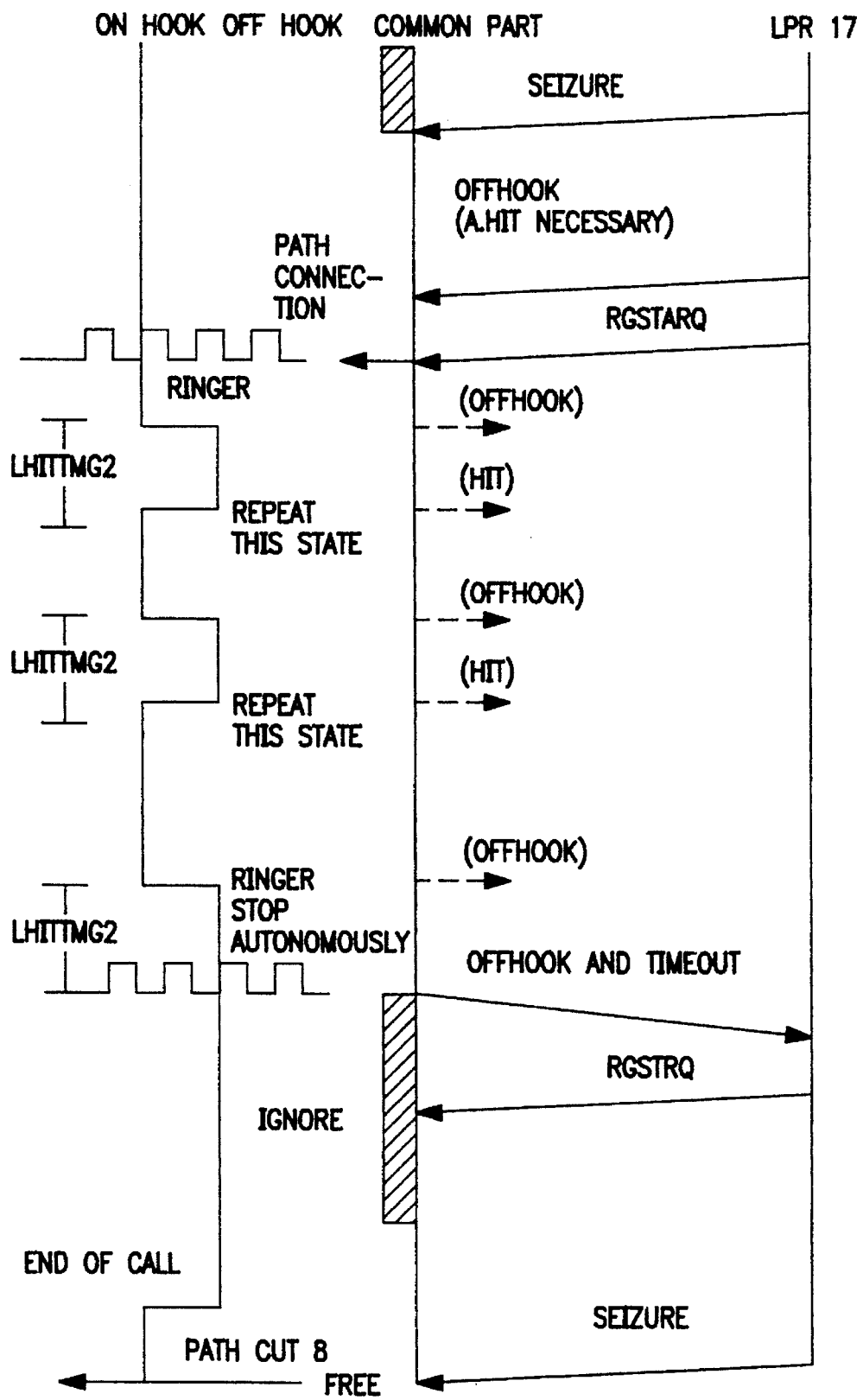
FIG. 19 is a sequence diagram for a response HIT detection.

FIG. 19 is a sequence diagram for a response HIT detection.

A response HIT detection is to detect an ON-HOOK caused by an erroneous operation, etc. made when a hand set is lifted on the receiving side. On receiving from the LPR 17 an OFFHOOK (off-hook detection start request) requesting a start of an off-hook detection and an RGSTRQ (ringing start request) requesting a start of ringing, the SPLC 11 starts ringing by connecting the line with the terminal of a call terminating subscriber line, and simultaneously monitors the off-hook state of the subscriber line of the call terminating subscriber line by detecting a change in the value of the bit "a".

On detecting the line put into an off-hook state after executing a HIT monitor, the SPLC 11 invokes a timer, starts counting the lapse of an off-hook period, and monitors whether or not the off-hook period counted by the timer exceeds predetermined duration LHITTMG2. If the off-hook period is less than predetermined duration LHITTMG2, the SPLC 11 repeats the state as a HIT detection. If the off-hook period is not less than predetermined duration LHITTMG2, the SPLC 11 stops ringing, and returns to the LPR 17 the OFFHOOK (off-hook detection start request) and a TIMEOUT indicating a time-out by the timer. In the sequence shown in FIG. 19, the common unit of the SPLC 11 does not respond to the SEIZURE command from the LPR 17 because the job is modified by the LPR 17 by issuing an ONHOOK detection request preceded by the SEIZURE command.

Figure 20:
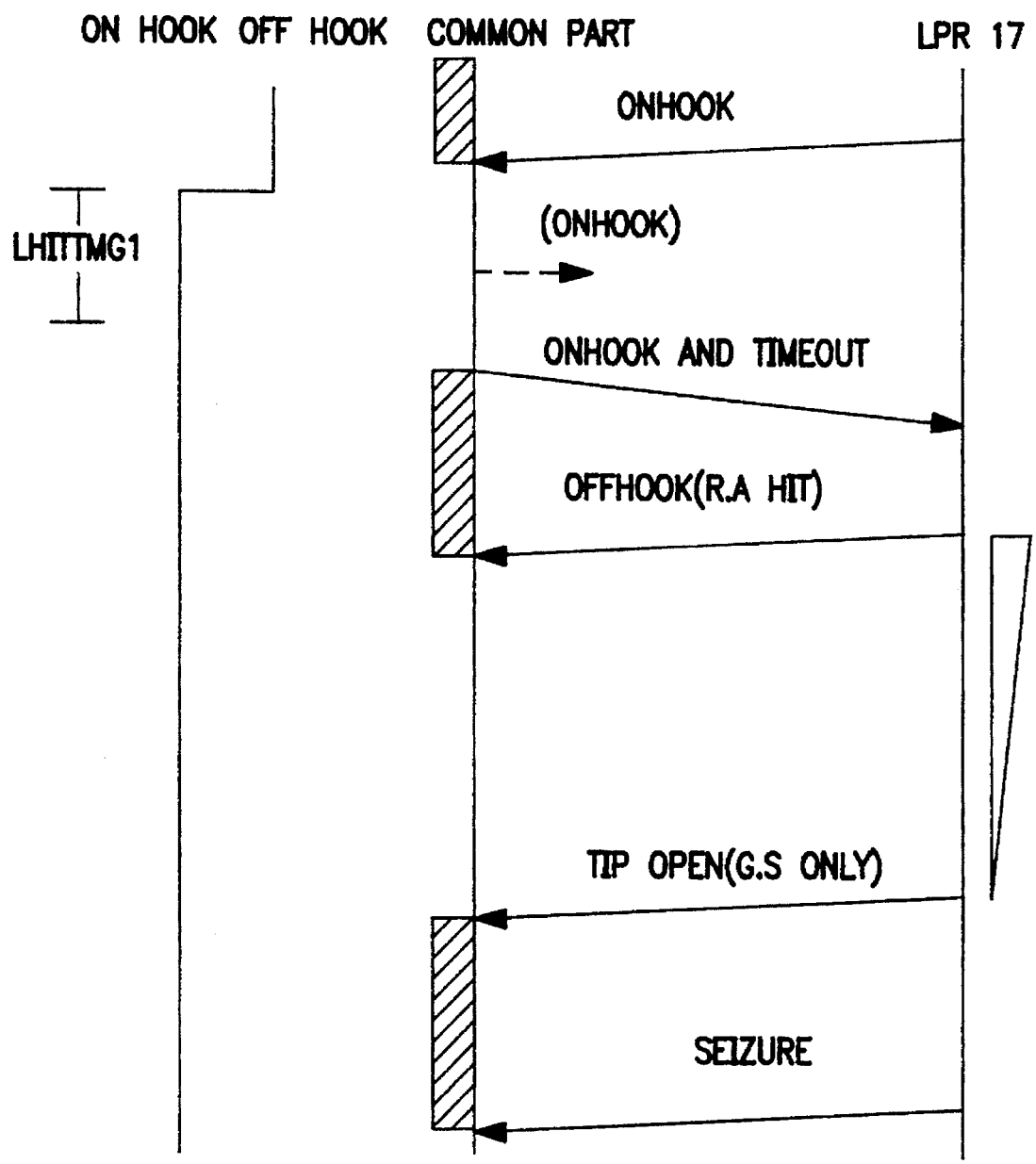
FIG. 20 is a sequence diagram for a disconnection on the call receiving side.

FIG. 20 is a sequence diagram for a disconnection on the call receiving side.

On receiving an ONHOOK (on-hook detection start request), the SPLC 11 executes a HIT monitor process. On detecting an on-hook state of a subscriber line of the call terminating subscriber line, the SPLC 11 invokes a timer, starts counting the duration of an on-hook period, and monitors whether or not the on-hook period counted by the timer exceeds predetermined duration LHITTMG1. If the on-hook period is not less than predetermined duration LHITTMG1, the SPLC 11 returns to the LPR 17 the ONHOOK (on-hook detection start request) and a TIMEOUT indicating a time-out by the timer. An R.A. HIT is to detect whether or not a hand set is onhooked erroneously by being dropped, etc. during the OFFHOOK.

Figure 21:
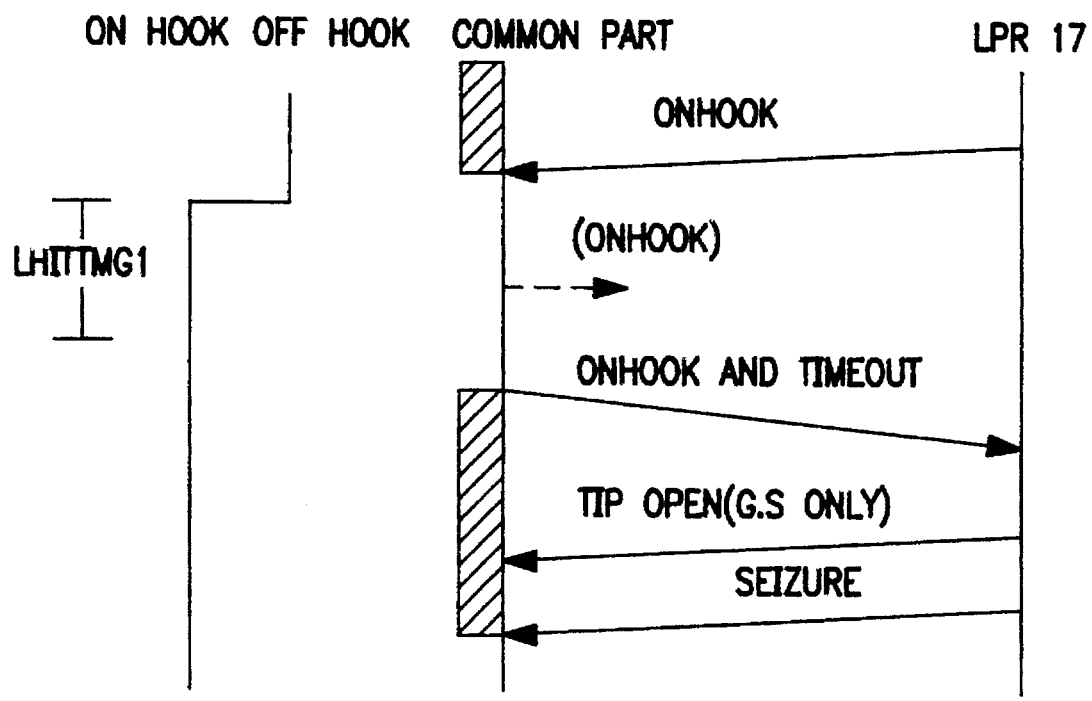
FIG. 21 is a sequence diagram for a disconnection on the call originating side.

FIG. 21 is a sequence diagram for a disconnection on the call originating side.

As with the sequence for disconnection on the call receiving side, the SPLC 11 interacts with the LPR 17 for a HIT monitor.

On receiving an ONHOOK (on-hook detection start request), the SPLC 11 executes a HIT monitor process. On detecting an on-hook state of a subscriber line of a call originating subscriber line, the SPLC 11 invokes a timer, starts counting the duration of an on-hook period, and monitors whether or not the on-hook period counted by the timer exceeds predetermined duration LHITTMG1. If the on-hook period is not less than predetermined duration LHITTMG1, the SPLC 11 returns to the LPR 17 the ONHOOK (on-hook detection start request) and a TIMEOUT indicating a time-out by the timer.

As described above, in this above embodiment a provision of both a scan input table and a last look table enables a line state to be detected simultaneously with a scanning to be performed by a timer, thereby significantly reducing the scanning time. The SPLSH 10 accommodating an analog subscriber line circuit and a digital subscriber line circuit performs a part (subscriber line scan/SD control) of a per line analog subscriber line control, thereby enabling a subscriber line channel to be switched between analog and digital.

An application of this invention is not limited only to an exchanger accommodating both an analog subscriber line and a digital subscriber line, but instead it can also be applied to an exchanger accommodating an analog subscriber line only.

What is claimed is:

1. A subscriber line control device for accommodating a plurality of analog subscriber lines, comprising:

memory means: a) for storing present on-hook and off-hook information indicating present line states for a plurality of subscriber lines, b) for storing previous on-hook and off-hook information indicating previous line states for said plurality of subscriber lines obtained in a previous scanning period, and c) for storing present timer information of a plurality of bits each respectively corresponding to the present on-hook and off-hook information for each of said plurality of subscriber lines and previous timer information of a plurality of bits each respectively corresponding to the previous on-hook and off-hook information for each of said plurality of subscriber lines, each of said plurality of bits of said present and previous timer information indicating a validity of a timer device for monitoring one of a) on-hook time for a monitoring process at each of said plurality of subscriber lines, b) off-hook time for a monitoring process of each of said plurality of subscriber lines and c) on and off time of dial pulses for a monitoring process of each of said plurality of subscriber lines, said validity of the timer device indicating a state wherein the timer device counts time when one of said monitoring processes is required;

detecting means for simultaneously detecting a change in each of the present and previous line states of each of said plurality of subscriber lines and for determining a validity of said timer device by comparing the previous on-hook and off-hook information with the present on-hook and off-hook information at predetermined intervals and comparing the previous and present timer information included in the previous and present on-hook and off-hook information, respectively; and control means for a) validating said timer device using the present and previous timer information in said memory means corresponding to each of the plurality of subscriber lines if an instruction is issued via a subscriber line to require monitoring any of off-hook states, on-hook states, and dial pulses, and for b) counting one of the on-hook and off-hook time and the on and off time of dial pulses of the subscriber line through which the instruction is sent using said validated timer device if said detecting means detects a change in one of the states of the subscriber line through which the instruction is sent.

2. The subscriber line control device according to claim 1, wherein said memory means comprises a first table in a first memory area for storing the present on-hook and off-hook information indicating each of the present line states of each of said plurality of subscriber lines and a second table in a second memory area for storing the previous on-hook and off-hook information indicating each of the previous line states of each of said plurality of subscriber lines, and said present and previous timer information being stored in said first and second table for a present and previous scanning period, respectively, and said detecting means simultaneously detects a change in each of the present and previous line states of each of said plurality of subscriber lines and determines a validity of said timer device by determining a coincidence between the on-hook and off-hook information stored in said first table and the on-hook and off-hook information stored in said second table.

3. The subscriber line control device according to claim 2, wherein said first table stores said present on-hook and off-hook information in a plurality of bits indicating the present line states of said plurality of subscriber lines, respectively;

said second table stores said previous on-hook and off-hook information in a plurality of bits indicating the previous line states of said plurality of subscriber lines, respectively;

one of said first and second tables includes permanently stored information of plural bits corresponding to the present line states and the previous line states of each of said plurality of subscriber lines, for invalidating the timer device by setting a bit to zero for monitoring the on-hook and off-hook time of each said subscriber line and the on and off time of dial pulses;

the other one of said first and second tables stores timer information of a plurality of bits, corresponding to the present line states and the previous line states of each of said plurality of subscriber lines, for validating and invalidating the timer device for monitoring the on-hook and off-hook time of each said subscriber line and for monitoring the on and off time of dial pulses;

said detecting means simultaneously detects a change in the line states of each said subscriber line and determines a validity of said timer device, by determining a coincidence between the on-hook and off-hook information stored in said first table and the on-hook and off-hook information stored in said second table;

said control means rewrites the timer information on a subscriber line for use in monitoring off-hook conditions into information indicating that said timer device for monitoring off-hook conditions is valid, when an instruction to monitor an off-hook condition is issued via the subscriber line, and starts the timer device to count the off-hook time if said detecting means detects that the line states of the subscriber line has changed from an on-hook state to an off-hook state;

said control means rewrites the timer information for use in monitoring the on-hook conditions corresponding to a subscriber line into information indicating that said timer device for monitoring on-hook conditions is valid, when an instruction is issued via the subscriber line to monitor an on-hook condition, and starts the timer device to count the on-hook time if said detecting means detects that the line states of the specified subscriber line has turned an off-hook state to an on-hook state; and said control means rewrites the timer information for use in monitoring dial pulses corresponding to a subscriber line into information indicating that said timer device for monitoring dial pulses is valid, when an instruction is issued via the subscriber line to monitor dial pulses, and starts the timer device to count on and off time of dial pulses.

4. The subscriber line control device according to claim 2, wherein said detecting means uses a comparison string instruction to simultaneously a) detect a change in each of the present and previous line states of each of said plurality of subscriber lines and b) determine a validity of said timer device by sequentially comparing said information in said first table with said information in the second table.

5. The subscriber line control device according to claim 1, wherein said control means comprises congestion control means for setting a maximum number of events for call processes related to the on-hook, off-hook and line states and for limiting a number of issued events to be smaller than the set maximum number based on a scan performed periodically by said detecting means on each of the present and previous line states of each of said plurality of subscriber lines, and based on said validated timer device, by executing selected call processes if the number of issued events reaches the maximum number of events.

6. The subscriber line control device according to claim 2, wherein said control means comprises congestion control means for setting a maximum number of events for call processes related to the on-hook, off-hook and line states and a maximum number of subscriber lines for monitoring dial pulses and for managing a number of events and a number of subscriber lines to be equal to or smaller than the set maximum numbers, respectively, by executing selected call processes if the number of events and the number of subscriber lines for monitoring dial pulses reach the maximum number of events and the maximum number of subscriber lines, respectively.

7. A subscriber line control device for accommodating analog and digital subscriber lines, comprising:

memory means: a) for storing present on-hook and off-hook information indicating present line states for a plurality of subscriber lines, b) for storing previous on-hook and off-hook information indicating previous line states for said plurality of subscriber lines obtained in a previous scanning period, and c) for storing present timer information of a plurality of bits each respectively corresponding to the present on-hook and off-hook information for each of said plurality of subscriber lines and previous timer information of a plurality of bits each respectively corresponding to the previous on-hook and off-hook information for each of said plurality of subscriber line lines, each of said plurality of bits of said present and previous timer information indicating a validity of a timer device for monitoring one of a) on-hook time for a monitoring process of each of said plurality of subscriber lines, b) off-hook time for a monitoring process of each of said plurality of subscriber lines and c) on and off time of dial pulses for a monitoring process of each of said plurality of subscriber lines, said validity of the timer device indicating a state wherein the timer device counts time when one of said monitoring processes is required;

detecting means for simultaneously detecting a change in each of the present and previous line states of each of said plurality of subscriber lines and for determining a validity of said timer device by comparing the present on-hook and off-hook information with the previous on-hook and off-hook information at predetermined intervals and comparing the previous and present timer information included in the previous and present on-hook and off-hook information, respectively;

control means for a) validating said timer device using the present and previous timer information in said memory means corresponding to each of the plurality of subscriber lines if an instruction is issued via a subscriber line to require monitoring any of off-hook states, on-hook states, and dial pulses, and for b) counting one of the on-hook and off-hook time and the on and off time of dial pulses of the subscriber line through which the instruction is sent using said validated timer device if said detecting means detects a change in one of the states of the subscriber line through which the instruction is sent; and congestion control means for setting a maximum number of events for call processes and a maximum number of subscriber lines for monitoring dial pulses and for managing a number of events and a number of subscriber lines to be equal to or smaller than the set maximum numbers, respectively, by executing selected call processes if the number of events and the number of subscriber lines for monitoring dial pulses reach the maximum number of events and the maximum number of subscriber lines, respectively.

8. A switching system including a subscriber line control device and a call processing device for accommodating a plurality of analog subscriber lines, said subscriber line control device comprising:

memory means: a) for storing present on-hook and off-hook information indicating present line states for a plurality of subscriber lines, b) for storing previous on-hook and off-hook information indicating previous line states for said plurality of subscriber lines obtained in a previous scanning period, and c) for storing present timer information of a plurality of bits each respectively corresponding to the present on-hook and off hook information for each of said plurality of subscriber lines and previous timer information of a plurality of bits each respectively corresponding to the previous on-hook and off-hook information for each of said plurality of subscriber lines, each of said plurality of bits of said present and previous timer information indicating a validity of a timer device for monitoring one of a) on-hook time for a monitoring process of each of said plurality of subscriber lines, b) off-hook time for a monitoring process of each of said plurality of subscriber lines and c) on and off time of dial pulses for a monitoring process of each of said plurality of subscriber lines, said validity of the timer device indicating a state wherein the timer device counts time when one of said monitoring processes is required;

detecting means for simultaneously detecting a change in each of the present and previous line states of each of said plurality of subscriber lines and for determining a validity of said timer device by comparing the present on-hook and off-hook information with the previous on-hook and off-hook information at predetermined intervals the previous and present timer information included in the previous and present on-hook and off-hook information, respectively;

control means for a) validating said timer device using the present and previous timer information from said memory means corresponding to each of the plurality of subscriber lines if an instruction is issued via a subscriber line to require monitoring any of off-hook states, on-hook states, and dial pulses, and for b) counting one of the on-hook and off-hook time and the on and off time of dial pulses of the subscriber line through which the instruction is sent using said validated timer device if said detecting means detects a change in one of the states of the subscriber line through which the instruction is sent; and congestion control means for setting a maximum first number of events associated with call processes in the subscriber line control device, a maximum second number of events associated with call processes between the subscriber control device and the call processing device, and a maximum number of subscriber lines for monitoring dial pulses, and for managing a first number of events, a second number of events, and a number of subscriber lines requesting monitoring to be equal to or smaller than the set maximum numbers, respectively, by executing selected call processes if the first number of events, the second number of events and the number of subscriber lines for monitoring dial pulses reach the maximum first number of events, the maximum second number of events and the maximum number of subscriber lines, respectively.

9. The subscriber line control device in the switching system according to claim 8, wherein said memory means comprises a first table in a first memory area for storing the present on-hook and off-hook information indicating each of the present line states of each of said plurality of subscriber lines and a second table in a second memory area for storing the previous on-hook and off-hook information indicating each of the previous line states of each of said plurality of subscriber lines, and said present and previous timer information being stored in said first and second table for a present and previous scanning period, respectively, and said detecting means simultaneously detects a change in each of the present and previous line states of each said plurality of subscriber lines and determines a validity of said timer device by determining a coincidence between the on-hook and off-hook information stored in said first table and the on-hook and off-hook information stored in said second table.

10. The switching system according to claim 9, wherein said first table stores said present on-hook and off-hook information in a plurality of bits indicating the present line states of said plurality of subscriber lines, respectively;

said second table stores said previous on-hook and off-hook information in a plurality of bits indicating the previous line states of said plurality of subscriber lines, respectively;

one of said first and second tables includes permanently stored information of plural bits corresponding to the present line states and the previous line states of each of said plurality of subscriber lines, for invalidating the timer device by setting a bit to zero for monitoring the on-hook and off-hook time of each subscriber line and the on and off time of dial pulses;

the other one of said first and second tables stores timer information of a plurality of bits, corresponding to the present line states and the previous line states of each of said subscriber lines, for validating and invalidating the timer device for monitoring the on-hook and off-hook time of each said subscriber line and for monitoring the on and off time of dial pulses;

said detecting means simultaneously detects a change in the line states of each said subscriber line and determines said valid timer device, by determining a coincidence between the on-hook and off-hook information stored in said first table and the on-hook and off-hook information stored in said second table;

said control means rewrites the timer information on a subscriber line for use in monitoring off-hook conditions into information indicating that said timer device for monitoring off-hook conditions is valid, when an instruction to monitor an off-hook condition is issued via the subscriber line, and starts the timer device to count the off-hook time if said detecting means detects that the line states of the subscriber line has changed from an on-hook state to an off-hook state;

said control means rewrites the timer information for use in monitoring the on-hook conditions corresponding to a subscriber line into information indicating that said timer device for monitoring on-hook conditions is valid, when an instruction is issued via the subscriber line to monitor on-hook conditions, and starts the timer device to count the on-hook time if said detecting means detects that the line states of the specified subscriber line has turned an off-hook state to an on-hook state; and said control means rewrites the timer information for use in monitoring dial pulses corresponding to a subscriber line into information indicating that said timer device for monitoring dial pulses is valid, when an instruction is issued via the subscriber line to monitor dial pulses, and starts the timer device to count on and off time of dial pulses.

11. The switching system according to claim 8, wherein said subscriber line control device accommodates said plurality of analog subscriber lines and a plurality of digital subscriber lines.

* * * * *